(12) United States Patent
Zhang et al.

(10) Patent No.: US 12,380,688 B2
(45) Date of Patent: Aug. 5, 2025

(54) NEURAL NETWORK CONSTRUCTION METHOD AND APPARATUS, AND IMAGE PROCESSING METHOD AND APPARATUS

(71) Applicant: HUAWEI TECHNOLOGIES CO., LTD., Shenzhen (CN)

(72) Inventors: Yikang Zhang, Beijing (CN); Zhao Zhong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 17/700,098

(22) Filed: Mar. 21, 2022

(65) Prior Publication Data

US 2022/0222934 A1    Jul. 14, 2022

Related U.S. Application Data

(63) Continuation of application No. PCT/CN2020/116673, filed on Sep. 22, 2020.

(30) Foreign Application Priority Data

Sep. 24, 2019  (CN) ......................... 201910904314.7
Jun. 24, 2020  (CN) ......................... 202010588884.2

(51) Int. Cl.
   *G06V 10/82*      (2022.01)
   *G06N 3/04*       (2023.01)
   *G06V 10/764*     (2022.01)

(52) U.S. Cl.
   CPC ............... *G06V 10/82* (2022.01); *G06N 3/04* (2013.01); *G06V 10/764* (2022.01)

(58) Field of Classification Search
   CPC ......... G06V 10/82; G06V 10/764; G06N 3/04
   See application file for complete search history.

(56) References Cited

U.S. PATENT DOCUMENTS

2017/0161606 A1   6/2017  Duan et al.
2017/0329892 A1*  11/2017 Fan .................. G16B 15/00
(Continued)

FOREIGN PATENT DOCUMENTS

CN    108133223 A    6/2018
CN    109284820 A    1/2019
(Continued)

OTHER PUBLICATIONS

Xin Li et al, Partial Order Pruning: for Best Speed/Accuracy Trade-off in Neural Architecture Search, 2019 IEEE/CVF Conference on Computer Vision and Pattern Recognition (CVPR), total 9 pages.
(Continued)

*Primary Examiner* — Qun Shen
(74) *Attorney, Agent, or Firm* — Rimon PC

(57) ABSTRACT

This application discloses a neural network construction method and apparatus, and an image processing method and apparatus in the field of artificial intelligence. The neural network construction method includes: constructing a search space based on an application requirement of a target neural network, where the search space includes M elements, the M elements are used to indicate M network structures, each of the M elements includes a quantity of blocks in a stage in a corresponding network structure and a channel quantity of each block, and M is a positive integer; and selecting a target network structure from the M network structures based on a distribution relationship among unevaluated elements in the search space. According to the method, a neural network satisfying a performance requirement can be efficiently constructed.

8 Claims, 11 Drawing Sheets

(56) References Cited

U.S. PATENT DOCUMENTS

| | | | |
|---|---|---|---|
| 2019/0286984 A1 | 9/2019 | Vasudevan et al. | |
| 2020/0097810 A1* | 3/2020 | Hetherington | G06N 20/20 |
| 2020/0143227 A1* | 5/2020 | Tan | G06N 3/084 |
| 2020/0143231 A1* | 5/2020 | Fusi | G06F 18/217 |
| 2021/0004442 A1* | 1/2021 | Sapugay | G06F 40/295 |

FOREIGN PATENT DOCUMENTS

| | | | | |
|---|---|---|---|---|
| CN | 109598332 A * | 4/2019 | | G06N 3/04 |
| CN | 109919304 A | 6/2019 | | |
| CN | 110175671 A | 8/2019 | | |
| CN | 110209857 A | 9/2019 | | |
| IN | 110020667 A | 7/2019 | | |
| JP | 2004021937 A * | 1/2004 | | |
| WO | 2019018375 A1 | 1/2019 | | |

OTHER PUBLICATIONS

Barret Zoph et al, Neural Architecture Search With Reinforcement Learning, arXiv:1611.01578v2 [cs.LG] Feb. 15, 2017, total 16 pages.

Hieu Pham et al, Efficient Neural Architecture Search via Parameter Sharing, arXiv:1802.03268v2 [cs.LG] Feb. 12, 2018, total 11 pages.

Liam Li et al, Random Search and Reproducibility for Neural Architecture Search, arXiv:1902.07638v3 [cs.LG] Jul. 30, 2019, total 20 pages.

Janxiao Liu et al, Darts: Differentiable Architecture Search, arXiv:1806.09055v2 [cs.LG] Apr. 23, 2019, total 13 pages.

Mingxing Tan et al, EfficientNet: Rethinking Model Scaling for Convolutional Neural Networks, arXiv:1905.11946v5 [cs.LG] Sep. 11, 2020, total 11 pages.

Kaiming He et al, Deep Residual Learning for Image Recognition, arXiv:1512.03385v1 [cs.CV] Dec. 10, 2015, total 12 pages.

Eric Brochu et al, A Tutorial on Bayesian Optimization of Expensive Cost Functions, with Application to Active User Modeling and Hierarchical Reinforcement Learning, arXiv:1012.2599v1 [cs.LG] Dec. 12, 2010, total 49 pages.

Zechun Liu et al, MetaPruning: Meta Learning for Automatic Neural Network Channel Pruning, arXiv:1903.10258v3 [cs.CV] Aug. 14, 2019, total 10 pages.

Jian-Hao Luo et al, ThiNet: A Filter Level Pruning Method for Deep Neural Network Compression, arXiv:1707.06342v1 [cs.CV] Jul. 20, 2017, total 9 pages.

Mao Ye et al, Good Subnetworks Provably Exist: Pruning via Greedy Forward Selection, arXiv:2003.01794v3 [cs.LG] Oct. 19, 2020, total 23 pages.

Mark Sandler et al, MobileNetV2: Inverted Residuals and Linear Bottlenecks, arXiv:1801.04381v4 [cs.CV] Mar. 21, 2019, total 14 pages.

Tsung-Yi Lin et al, Focal Loss for Dense Object Detection, arXiv:1708.02002v2 [cs.CV] Feb. 7, 2018, total 10 pages.

Kaiming He et al, Mask R-CNN, arXiv:1703.06870v3 [cs.CV] Jan. 24, 2018, total 12 pages.

Mingxing Tan et al., "MnasNet: Platform-Aware Neural Architecture Search for Mobile," 2019 IEEE/CVF Conference on Computer Vision and Pattern Recognition (CVPR), 9 pages.

Teresa Araujo et al., "Improving Convolutional Neural Network Design via Variable Neighborhood Search," ICIAR 2017, LNCS 10317, 2017, 9 pages.

* cited by examiner

NEURAL NETWORK CONSTRUCTION METHOD AND APPARATUS, AND IMAGE PROCESSING METHOD AND APPARATUS

CROSS-REFERENCE TO RELATED APPLICATIONS

This application is a continuation of International Application No. PCT/CN2020/116673, filed on Sep. 22, 2020, which claims priority to Chinese Patent Application No. 201910904314.7, filed on Sep. 24, 2019 and Chinese Patent Application No. 202010588884.2, filed on Jun. 24, 2020. The disclosures of the aforementioned applications are hereby incorporated by reference in their entireties.

TECHNICAL FIELD

This application relates to the field of artificial intelligence, and more specifically, to a neural network construction method and apparatus, and an image processing method and apparatus.

BACKGROUND

Artificial intelligence (AI) is a theory, a method, a technology, and an application system that simulates, extends, and expands human intelligence by using a digital computer or a machine controlled by a digital computer, to sense the environment, obtain knowledge, and use the knowledge to obtain an optimal result. In other words, artificial intelligence is a branch of computer science, and is intended to understand the essence of intelligence and produce new intelligent machines that can react in a manner similar to human intelligence. Artificial intelligence seeks to study design principles and implementation methods of various intelligent machines, so that the machines have perception, inference, and decision-making functions. Research in the field of artificial intelligence looks at robots, natural language processing, computer vision, decision-making and inference, human-machine interaction, recommendation and search, AI basic theories, and the like.

With the rapid development of artificial intelligence technologies, the performance of neural networks (for example, a convolutional neural network) are continuously improved, and neural networks have made great achievements in processing and analyzing a plurality of types of media signals such as images, video, and voice. A neural network with good performance usually has a smart network structure. However, in actual application, due to differences in training sets, indicator requirements, and application objectives, an existing network structure usually cannot be directly used.

Currently, a common method is to perform adjustment for different tasks based on an existing network structure. However, it is usually difficult to obtain a network structure with excellent performance through adjustment. Another common method is to perform automatic search on a network structure based on automated machine learning (AutoML). However, AutoML is a method for designing a network structure from scratch, and the task is very complex.

Therefore, how to efficiently construct a neural network satisfying a performance requirement is a technical problem to be resolved urgently.

SUMMARY

This application provides a neural network construction method and apparatus, and an image processing method and apparatus, to efficiently construct a neural network satisfying a performance requirement.

According to a first aspect, a neural network construction method is provided. The method includes: constructing a search space based on an application requirement of a target neural network, where the search space includes M elements, the M elements are used to indicate M network structures, each of the M elements includes a quantity of blocks in a stage in a corresponding network structure and a channel quantity of each block, and M is a positive integer; and selecting a target network structure from the M network structures based on a distribution relationship among unevaluated elements in the search space.

In this embodiment of this application, a representative element in the search space may be selected based on the distribution relationship among the unevaluated elements. In this case, the target network structure can be efficiently selected from the M network structures based on the representative element, so that a neural network satisfying a performance requirement can be efficiently constructed.

Optionally, the network structure corresponding to each of the M elements is a network structure indicated by each of the M elements.

Correspondingly, each of the M elements includes a quantity of blocks in a stage in the network structure indicated by the element and a channel quantity of each block.

With reference to the first aspect, in some implementations of the first aspect, the application requirement of the target neural network includes a running speed of the target neural network, a parameter quantity of the target neural network, or a structure requirement of the target neural network, and the structure requirement includes a quantity of blocks in each stage in the target neural network and a channel quantity of each block.

In this embodiment of this application, the search space is constructed based on the running speed of the target neural network, the parameter quantity of the target neural network, or the structure requirement of the target neural network, and some low-performance network structures may be screened out in a process of constructing the search space, so that neural network construction efficiency can be improved.

With reference to the first aspect, in some implementations of the first aspect, the constructing search space based on an application requirement of a target neural network includes: constructing an initial search space based on the application requirement of the target neural network, where the initial search space includes N initial elements, the N initial elements are used to indicate N initial network structures, each of the N initial elements includes a quantity of blocks in a stage in a corresponding initial network structure and a channel quantity of each block, and N is a positive integer greater than or equal to M; and performing, according to a preset rule, screening on the N initial network structures indicated by the N initial elements, to obtain the M elements in the search space, where the preset rule includes: if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

In this embodiment of this application, according to the foregoing preset rule, when the initial network structures indicated by the N initial elements in the initial search space are not trained, a low-performance network structure in the N initial network structures can be screened out based on only structure information of the N initial network structures. Therefore, neural network construction efficiency can be improved.

With reference to the first aspect, in some implementations of the first aspect, the selecting a target network structure from the M network structures based on a distribution relationship among unevaluated elements in the search space includes: determining K elements in the unevaluated elements based on the distribution relationship among the unevaluated elements, where K is a positive integer less than M; and selecting the target network structure from the M network structures based on the K elements.

With reference to the first aspect, in some implementations of the first aspect, the selecting the target network structure from the M network structures based on the K elements includes: evaluating K network structures indicated by the K elements in the unevaluated elements, to obtain evaluation results of evaluated elements, where the evaluation results of the evaluated elements include evaluation results of the K network structures; and selecting the target network structure from the M network structures based on the evaluation results of the evaluated elements.

In this embodiment of this application, the target network structure that satisfies a preset requirement is selected from the M network structures based on an evaluation result of an evaluated network structure, so that the evaluation result of the evaluated network structure can be fully used. Therefore, neural network construction efficiency can be improved.

With reference to the first aspect, in some implementations of the first aspect, the selecting the target network structure from the M network structures based on the evaluation results of the evaluated elements includes: performing modeling on first unevaluated elements based on the evaluation results of the evaluated elements, to obtain models of the first unevaluated elements, where the first unevaluated elements include elements other than the evaluated elements in the search space; and selecting the target network structure from the M network structures based on the models of the first unevaluated elements.

In this embodiment of this application, modeling is performed on the first unevaluated elements based on the evaluation results of the evaluated elements, to obtain the models of the first unevaluated elements. Using the models of the first unevaluated elements helps select a representative element in the search space. In this case, the target network structure can be efficiently selected from the M network structures based on the representative element, so that a neural network satisfying a performance requirement can be efficiently constructed.

With reference to the first aspect, in some implementations of the first aspect, when the target network structure fails to be selected from the M network structures based on the distribution relationship among the unevaluated elements in the search space, the method further includes: selecting the target network structure from the M network structures based on a distribution relationship among the first unevaluated elements and the models that are of the first unevaluated elements and that are constructed based on the evaluated elements.

With reference to the first aspect, in some implementations of the first aspect, the selecting the target network structure from the M network structures based on a distribution relationship among the first unevaluated elements and the models that are of the first unevaluated elements and that are constructed based on the evaluated elements includes: determining L elements in the first unevaluated elements based on the distribution relationship among the first unevaluated elements, where L is a positive integer less than M; and selecting the target network structure from the M network structures based on the L elements and the models that are of the first unevaluated elements and that are constructed based on the evaluated elements.

With reference to the first aspect, in some implementations of the first aspect, the selecting the target network structure from the M network structures based on the L elements and the models that are of the first unevaluated elements and that are constructed based on the evaluated elements includes: determining Q elements in the L elements based on the models that are of the first unevaluated elements and that are constructed based on the evaluated elements, where Q is a positive integer less than L; evaluating Q network structures indicated by the Q elements, to obtain evaluation results of first evaluated elements, where the evaluation results of the first evaluated elements include the evaluation results of the K network structures and evaluation results of the Q network structures; and selecting the target network structure from the M network structures based on the evaluation results of the first evaluated elements and a distribution relationship among second unevaluated elements, where the second unevaluated elements include elements other than the first evaluated elements in the search space.

With reference to the first aspect, in some implementations of the first aspect, the distribution relationship among the first unevaluated elements is a clustering result of the first unevaluated elements, and the L elements are elements in L clusters included in the clustering result of the first unevaluated elements.

In this embodiment of this application, using the clustering result of the first unevaluated elements helps select a representative element in the search space. In this case, the target network structure can be efficiently selected from the M network structures based on the representative element, so that a neural network satisfying a performance requirement can be efficiently constructed.

With reference to the first aspect, in some implementations of the first aspect, the L elements are L elements corresponding to centers of the L clusters.

In this embodiment of this application, L network structures indicated by the L elements corresponding to the centers of the L clusters are the most representative network structures in the search space. The target network structure that satisfies a preset requirement is selected from the M network structures based on the evaluation results of the Q network structures indicated by the Q elements selected from the L elements, so that the target network structure that satisfies the preset requirement can be efficiently selected from the M network structures. Therefore, neural network construction efficiency can be improved.

With reference to the first aspect, in some implementations of the first aspect, when the target network structure fails to be selected from the M network structures based on the distribution relationship among the first unevaluated elements and the models that are of the first unevaluated elements and that are constructed based on the evaluated elements, the method further includes: reselecting the target network structure from the M network structures based on the distribution relationship among the second unevaluated elements and models that are of the second unevaluated elements and that are constructed based on the first evaluated elements.

In this embodiment of this application, when the target network structure fails to be selected from the M network structures based on the distribution relationship among the first unevaluated elements and the models that are of the first unevaluated elements and that are constructed based on the evaluated elements, the target network structure is reselected from the M network structures based on the distribution relationship among the second unevaluated elements and the models that are of the second unevaluated elements and that are constructed based on the first evaluated elements, so that an evaluation result of an evaluated network structure can be fully used. Therefore, neural network construction efficiency can be improved.

With reference to the first aspect, in some implementations of the first aspect, the models that are of the first unevaluated elements and that are constructed based on the evaluated elements include: the models of the first unevaluated elements are obtained based on evaluation results of evaluated network structures according to the following formula:

$$\frac{g(x)}{l(x)} \text{ and/or } (g(x) - l(x))^2.$$

Herein, x represents an unevaluated network structure in the search space, y* represents a precision threshold, g(x) represents a conditional probability density function of a network structure x whose precision is greater than the precision threshold y*, $$g(x) = \sum_{\{i|y_i > y^*\}} \omega_i G^*(x | x_i),$$

l(x) represents a conditional probability density function of a network structure x whose precision is less than or equal to the precision threshold y*, $$l(x) = \sum_{\{i|y_i \leq y^*\}} \omega_i G^*(x | x_i), G^*(x | x_i)$$

represents a Gaussian distribution, $$G^*(x | x_i) = \frac{1}{Z} e^{-\frac{(\kappa^*(x,x_i))^2}{2\sigma^2}},$$

$\kappa(x,x_i)$ represents a Euclidean distance between x and $x_i$, $\kappa^*(x, x_i)$ represents a distance function including $\kappa(x, x_i)$, $$\kappa^*(x, x_i) = \begin{cases} \kappa(x, x_i), & \text{if } \kappa(x, x_i) < 2\sigma \\ \infty, & \text{if } \kappa(x, x_i) \geq 2\sigma \end{cases},$$

$x_i$ represents an $i^{th}$ network structure in the evaluated network structures, $y_i$ represents precision of the $i^{th}$ network structure in the evaluated network structures, $\omega_i$ represents a weight corresponding to $G^*(x|x_i)$, Z represents a normalization factor, σ represents a hyperparameter of $G^*(x|x_i)$, i is a positive integer, and e is a base of a natural logarithm function.

With reference to the first aspect, in some implementations of the first aspect, the models that are of the first unevaluated elements and that are constructed based on the evaluated elements include: the models of the first unevaluated elements are obtained based on evaluation results of evaluated network structures according to the following formula:

$$\varphi_{EI}(x) = \mathbb{E}_{\mathcal{O}}(\max\{0, f(x) - \tau | \mathcal{O}\}).$$

Herein, x represents an unevaluated element in the search space, $\mathcal{O} = \{(x_0, y_0), (x_1, y_1), \ldots\}$, $x_i$ represents an $i^{th}$ element in the evaluated elements, $y_i$ represents precision of the $i^{th}$ element in the evaluated elements, $\tau = \max(y_i)$, $\mathbb{E}$ represents an expectation function, $f(x)$ is a random variable subject to a Gaussian distribution, and a mean $\mu(x)$ of $f(x)$, a variance $\sigma(x)$ of $f(x)$, $\mathcal{O}$, and an input x satisfy the following relationship:

$$\mu(x) = k^T(K + \eta^2 I)^{-1} Y; \text{ and}$$

$$\sigma(x) = 1 - k^T(K + \eta^2 I)^{-1} k.$$

Herein, n is a quantity of evaluated network structures, Y is a vector including $y_i$, $Y \in R^n$, $Y_i = y_i$, k is a vector including $\kappa(x, x_i)$, $k \in R^n$, $k_i = \kappa(x, x_i)$, K is a matrix including $\kappa(x_i, x_j)$, $K \in R^{n \times n}$, $K_{i,j} = \kappa(x_i, x_j)$, $$\kappa(x, x') = e^{\left(-\frac{1}{2\sigma^2} \|x - x'\|^2\right)},$$

σ is a hyperparameter, e is a base of a natural logarithm function, I is an identity matrix, η is also a hyperparameter, and i,j are positive integers.

With reference to the first aspect, in some implementations of the first aspect, the distribution relationship among the unevaluated elements is a clustering result of the unevaluated elements, and the K elements are elements in K clusters included in the clustering result of the unevaluated elements.

In this embodiment of this application, using the clustering result of the unevaluated elements helps select a representative element in the search space. In this case, the target network structure can be efficiently selected from the M network structures based on the representative element, so that a neural network satisfying a performance requirement can be efficiently constructed.

With reference to the first aspect, in some implementations of the first aspect, the K elements are K elements corresponding to centers of the K clusters.

In this embodiment of this application, the K network structures indicated by the K elements corresponding to the centers of the K clusters are the most representative network structures in the search space. The target network structure that satisfies a preset requirement is selected from the M network structures based on the evaluation results of the K network structures indicated by the K elements corresponding to the centers of the K clusters, so that the target network structure that satisfies the preset requirement can be efficiently selected from the M network structures. Therefore, neural network construction efficiency can be improved.

According to a second aspect, an image processing method is provided. The method includes: obtaining a to-be-processed image; and classifying the to-be-processed image based on a target neural network, to obtain a classification result of the to-be-processed image, where the target neural network is constructed based on a target network structure, and the target network structure is obtained by using the method in any implementation of the first aspect.

It should be understood that, before image classification, the target neural network used in the image processing method in the second aspect further needs to be trained based on a training image, and the to-be-processed image may be classified based on a trained target neural network.

In other words, the target neural network may be obtained by using the neural network structure search method in the first aspect, and then the target neural network is trained based on the training image. After the training is completed, the to-be-processed image may be classified based on the target neural network.

In this application, because the target neural network is constructed by using the method in the first aspect, the target neural network relatively satisfies or fits an application requirement of the neural network. A relatively good image classification effect (for example, a more accurate classification result) can be achieved by using such a neural network for image classification.

According to a third aspect, a neural network construction apparatus is provided. The apparatus includes: a construction unit, configured to construct a search space based on an application requirement of a target neural network, where the search space includes M elements, the M elements are used to indicate M network structures, each of the M elements includes a quantity of blocks in a stage in a corresponding network structure and a channel quantity of each block, and M is a positive integer; and a selection unit, configured to select a target network structure from the M network structures based on a distribution relationship among unevaluated elements in the search space.

In this embodiment of this application, a representative element in the search space may be selected based on the distribution relationship among the unevaluated elements. In this case, the target network structure can be efficiently selected from the M network structures based on the representative element, so that a neural network satisfying a performance requirement can be efficiently constructed.

Optionally, the network structure corresponding to each of the M elements is a network structure indicated by each of the M elements.

Correspondingly, each of the M elements includes a quantity of blocks in a stage in the network structure indicated by the element and a channel quantity of each block.

With reference to the third aspect, in some implementations of the third aspect, the application requirement of the target neural network includes a running speed of the target neural network, a parameter quantity of the target neural network, or a structure requirement of the target neural network, and the structure requirement includes a quantity of blocks in each stage in the target neural network and a channel quantity of each block.

In this embodiment of this application, the search space is constructed based on the running speed of the target neural network, the parameter quantity of the target neural network, or the structure requirement of the target neural network, and some low-performance network structures may be screened out in a process of constructing the search space, so that neural network construction efficiency can be improved.

With reference to the third aspect, in some implementations of the third aspect, the construction unit is specifically configured to: construct initial search space based on the application requirement of the target neural network, where the initial search space includes N initial elements, the N initial elements are used to indicate N initial network structures, each of the N initial elements includes a quantity of blocks in a stage in a corresponding initial network structure and a channel quantity of each block, and N is a positive integer greater than or equal to M; and perform, according to a preset rule, screening on the N initial network structures indicated by the N initial elements, to obtain the M elements in the search space, where the preset rule includes: if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

In this embodiment of this application, according to the foregoing preset rule, when the initial network structures indicated by the N initial elements in the initial search space are not trained, a low-performance network structure in the N initial network structures can be screened out based on only structure information of the N initial network structures. Therefore, neural network construction efficiency can be improved.

With reference to the third aspect, in some implementations of the third aspect, the selection unit is specifically configured to: determine K elements in the unevaluated elements based on the distribution relationship among the unevaluated elements, where K is a positive integer less than M; and select the target network structure from the M network structures based on the K elements.

With reference to the third aspect, in some implementations of the third aspect, the selection unit is specifically configured to: evaluate K network structures indicated by the K elements in the unevaluated elements, to obtain evaluation results of evaluated elements, where the evaluation results of the evaluated elements include evaluation results of the K network structures; and select the target network structure from the M network structures based on the evaluation results of the evaluated elements.

In this embodiment of this application, the target network structure that satisfies a preset requirement is selected from the M network structures based on an evaluation result of an evaluated network structure, so that the evaluation result of the evaluated network structure can be fully used. Therefore, neural network construction efficiency can be improved.

With reference to the third aspect, in some implementations of the third aspect, the selection unit is specifically configured to: perform modeling on first unevaluated elements based on the evaluation results of the evaluated elements, to obtain models of the first unevaluated elements, where the first unevaluated elements include elements other than the evaluated elements in the search space; and select the target network structure from the M network structures based on the models of the first unevaluated elements.

In this embodiment of this application, modeling is performed on the first unevaluated elements based on the evaluation results of the evaluated elements, to obtain the models of the first unevaluated elements. Using the models of the first unevaluated elements helps select a representative element in the search space. In this case, the target network structure can be efficiently selected from the M network structures based on the representative element, so that a neural network satisfying a performance requirement can be efficiently constructed.

With reference to the third aspect, in some implementations of the third aspect, when the target network structure fails to be selected from the M network structures based on the distribution relationship among the unevaluated elements in the search space, the selection unit is further configured to: select the target network structure from the M network structures based on a distribution relationship among the first unevaluated elements and the models that are of the first unevaluated elements and that are constructed based on the evaluated elements.

With reference to the third aspect, in some implementations of the third aspect, the selection unit is specifically configured to: determine L elements in the first unevaluated elements based on the distribution relationship among the first unevaluated elements, where L is a positive integer less than M; and select the target network structure from the M network structures based on the L elements and the models that are of the first unevaluated elements and that are constructed based on the evaluated elements.

With reference to the third aspect, in some implementations of the third aspect, the selection unit is specifically configured to: determine Q elements in the L elements based on the models that are of the first unevaluated elements and that are constructed based on the evaluated elements, where Q is a positive integer less than L; evaluate Q network structures indicated by the Q elements, to obtain evaluation results of first evaluated elements, where the evaluation results of the first evaluated elements include the evaluation results of the K network structures and evaluation results of the Q network structures; and select the target network structure from the M network structures based on the evaluation results of the first evaluated elements and a distribution relationship among second unevaluated elements, where the second unevaluated elements include elements other than the first evaluated elements in the search space.

With reference to the third aspect, in some implementations of the third aspect, the distribution relationship among the first unevaluated elements is a clustering result of the first unevaluated elements, and the L elements are elements in L clusters included in the clustering result of the first unevaluated elements.

In this embodiment of this application, using the clustering result of the first unevaluated elements helps select a representative element in the search space. In this case, the target network structure can be efficiently selected from the M network structures based on the representative element, so that a neural network satisfying a performance requirement can be efficiently constructed.

With reference to the third aspect, in some implementations of the third aspect, the L elements are L elements corresponding to centers of the L clusters.

In this embodiment of this application, L network structures indicated by the L elements corresponding to the centers of the L clusters are the most representative network structures in the search space. The target network structure that satisfies a preset requirement is selected from the M network structures based on the evaluation results of the Q network structures indicated by the Q elements determined from the L elements, so that the target network structure that satisfies the preset requirement can be efficiently selected from the M network structures. Therefore, neural network construction efficiency can be improved.

With reference to the third aspect, in some implementations of the third aspect, when the target network structure fails to be selected from the M network structures based on the distribution relationship among the first unevaluated elements and the models that are of the first unevaluated elements and that are constructed based on the evaluated elements, the selection unit is further configured to: reselect the target network structure from the M network structures based on the distribution relationship among the second unevaluated elements and models that are of the second unevaluated elements and that are constructed based on the first evaluated elements.

In this embodiment of this application, when the target network structure fails to be selected from the M network structures based on the distribution relationship among the first unevaluated elements and the models that are of the first unevaluated elements and that are constructed based on the evaluated elements, the target network structure is reselected from the M network structures based on the distribution relationship among the second unevaluated elements and the models that are of the second unevaluated elements and that are constructed based on the first evaluated elements, so that an evaluation result of an evaluated network structure can be fully used. Therefore, neural network construction efficiency can be improved.

With reference to the third aspect, in some implementations of the third aspect, the models of the first unevaluated elements are obtained based on evaluation results of evaluated network structures according to the following formula:

$$\frac{g(x)}{l(x)} \text{ and/or } (g(x) - l(x))^2.$$

Herein, x represents an unevaluated network structure in the search space, y* represents a precision threshold, g(x) represents a conditional probability density function of a network structure x whose precision is greater than the precision threshold y*, $$g(x) = \sum_{\{i|y_i > y^*\}} \omega_i G^*(x \mid x_i),$$

l(x) represents a conditional probability density function of a network structure x whose precision is less than or equal to the precision threshold y*, $$l(x) = \sum_{\{i|y_i \leq y^*\}} \omega_i G^*(x \mid x_i),$$

$G^*(x|x_i)$ represents a Gaussian distribution, $$G^*(x \mid x_i) = \frac{1}{Z} e^{-\frac{(\kappa^*(x,x_i))^2}{2\sigma^2}},$$

$\kappa(x, x_i)$ represents a Euclidean distance between x and $x_i$, $\kappa^*(x, x_i)$ represents a distance function including $\kappa(x, x_i)$, $$\kappa^*(x, x_i) = \begin{cases} \kappa(x, x_i), & \text{if } \kappa(x, x_i) < 2\sigma \\ \infty, & \text{if } \kappa(x, x_i) \geq 2\sigma \end{cases},$$

$x_i$ represents an $i^{th}$ network structure in the evaluated network structures, $y_i$ represents precision of the $i^{th}$ network structure in the evaluated network structures, $\omega_i$ represents a weight corresponding to $G^*(x|x_i)$, Z represents a normalization factor, $\sigma$ represents a hyperparameter of $G^*(x|x_i)$, i is a positive integer, and e is a base of a natural logarithm function.

With reference to the third aspect, in some implementations of the third aspect, the models of the first unevaluated elements are obtained based on evaluation results of evaluated network structures according to the following formula:

$$\varphi_{EI}(x) = \mathbb{E}(\max(0, f(x) - \tau | \mathcal{O})).$$

Herein, x represents an unevaluated element in the search space, $O = \{(x_0, y_0), (x_1, y_1), \ldots\}$, $x_i$ represents an $i^{th}$ element in the evaluated elements, $y_i$ represents precision of the $i^{th}$ element in the evaluated elements, $\tau = \max(y_i)$, $\mathbb{E}$ represents an expectation function, $f(x)$ is a random variable subject to a Gaussian distribution, and a mean $\mu(x)$ of $f(x)$, a variance $\sigma(x)$ of $f(x)$, $\mathcal{O}$, and an input x satisfy the following relationship:

$$\mu(x) = k^T(K + \eta^2 I)^{-1} Y; \text{ and}$$

$$\sigma(x) = 1 - k^T(K + \eta^2 I)^{-1} k.$$

Herein, n is a quantity of evaluated network structures, Y is a vector including $y_i$, $Y \in \mathbb{R}^n$, $Y_i = y_i$, k is a vector including $\kappa(x, x_i)$, $k \in \mathbb{R}^n$, $k_i = \kappa(x, x_i)$, K is a matrix including $\kappa(x_i, x_j)$, $K \in \mathbb{R}^{n \times n}$, $K_{i,j} = \kappa(x_i, x_j)$, $$\kappa(x, x') = e^{\left(-\frac{1}{2\sigma^2} \|x - x'\|^2\right)},$$

$\sigma$ is a hyperparameter, e is a base of a natural logarithm function, I is an identity matrix, $\eta$ is also a hyperparameter, and i,j are positive integers.

With reference to the third aspect, in some implementations of the third aspect, the distribution relationship among the unevaluated elements is a clustering result of the unevaluated elements, and the K elements are elements in K clusters included in the clustering result of the unevaluated elements.

In this embodiment of this application, using the clustering result of the unevaluated elements helps select a representative element in the search space. In this case, the target network structure can be efficiently selected from the M network structures based on the representative element, so that a neural network satisfying a performance requirement can be efficiently constructed.

With reference to the third aspect, in some implementations of the third aspect, the K elements are K elements corresponding to centers of the K clusters.

In this embodiment of this application, the K network structures indicated by the K elements corresponding to the centers of the K clusters are the most representative network structures in the search space. The target network structure that satisfies a preset requirement is selected from the M network structures based on the evaluation results of the K network structures indicated by the K elements corresponding to the centers of the K clusters, so that the target network structure that satisfies the preset requirement can be efficiently selected from the M network structures. Therefore, neural network construction efficiency can be improved.

According to a fourth aspect, an image processing apparatus is provided. The apparatus includes: an obtaining unit, configured to obtain a to-be-processed image; and an image processing unit, configured to classify the to-be-processed image based on a target neural network, to obtain a classification result of the to-be-processed image, where the target neural network is constructed based on a target network structure, and the target network structure is obtained by using the method in any implementation of the first aspect.

It should be understood that, before image classification, the target neural network used in the image processing method in the second aspect further needs to be trained based on a training image, and the to-be-processed image may be classified based on a trained target neural network.

In other words, the target neural network may be obtained by using the neural network structure search method in the first aspect, and then the target neural network is trained based on the training image. After the training is completed, the to-be-processed image may be classified based on the target neural network.

In this application, because the target neural network is constructed by using the method in the first aspect, the target neural network relatively satisfies or fits an application requirement of the neural network. A relatively good image classification effect (for example, a more accurate classification result) can be achieved by using such a neural network for image classification.

It should be understood that extensions to, limitations on, explanations for, and descriptions of related content in the first aspect are also applicable to same content in the second aspect, the third aspect, and the fourth aspect.

According to a fifth aspect, a neural network construction apparatus is provided. The apparatus includes: a memory, configured to store a program; and a processor, configured to execute the program stored in the memory. When the program stored in the memory is executed, the processor is configured to perform the method in any implementation of the first aspect.

The processor in the fifth aspect may be a central processing unit (CPU), or may be a combination of a CPU and a neural-network operation processor. The neural-network operation processor herein may include a graphics processing unit (GPU), a neural-network processing unit (NPU), a tensor processing unit (TPU), or the like. The TPU is an artificial intelligence accelerator-specific integrated circuit customized by Google for machine learning.

According to a sixth aspect, an image processing apparatus is provided. The apparatus includes: a memory, configured to store a program; and a processor, configured to execute the program stored in the memory. When the program stored in the memory is executed, the processor is configured to perform the method in any implementation of the second aspect.

The processor in the sixth aspect may be a central processing unit (CPU), or may be a combination of a CPU and a neural-network operation processor. The neural-network operation processor herein may include a graphics processing unit (GPU), a neural-network processing unit (NPU), a tensor processing unit (TPU), or the like. The TPU is an artificial intelligence accelerator-specific integrated circuit customized by Google for machine learning.

According to a seventh aspect, a computer-readable medium is provided. The computer-readable medium stores program code to be executed by a device, and the program code is used to perform the method in any implementation of the first aspect or the second aspect.

According to an eighth aspect, a computer program product including instructions is provided. When the computer program product runs on a computer, the computer is enabled to perform the method in any implementation of the first aspect or the second aspect.

According to a ninth aspect, a chip is provided. The chip includes a processor and a data interface. The processor reads, through the data interface, instructions stored in a memory, to perform the method in any implementation of the first aspect or the second aspect.

Optionally, in an implementation, the chip may further include the memory. The memory stores the instructions, and the processor is configured to execute the instructions stored in the memory. When the instructions are executed, the processor is configured to perform the method in any implementation of the first aspect or the second aspect.

The chip may specifically be a field programmable gate array (FPGA) or an application-specific integrated circuit (ASIC).

In the embodiments of this application, a representative element in the search space may be selected based on the distribution relationship among the unevaluated elements. In this case, the target network structure can be efficiently selected from the M network structures based on the representative element, so that a neural network satisfying a performance requirement can be efficiently constructed.

DESCRIPTION OF EMBODIMENTS

The following describes the technical solutions in the embodiments of this application with reference to the accompanying drawings in the embodiments of this application. It is clear that the described embodiments are merely some rather than all of the embodiments of this application. All other embodiments obtained by a person of ordinary skill in the art based on the embodiments of this application without creative efforts shall fall within the protection scope of this application.

Figure 1:
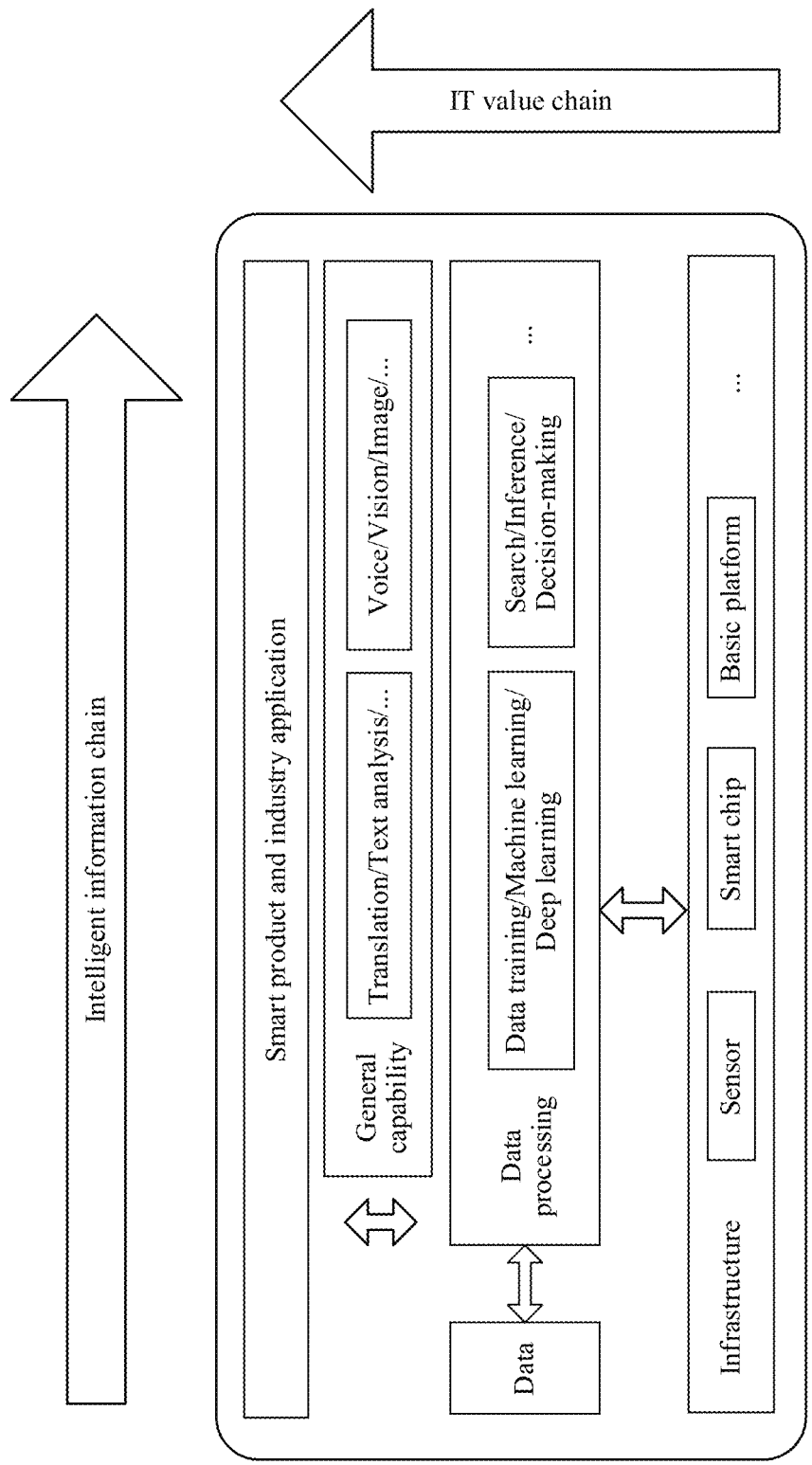
FIG. 1 is a schematic diagram depicting an overall framework of artificial intelligence according to an embodiment of this application.

FIG. 1 is a schematic diagram depicting an overall framework of artificial intelligence. The overall framework describes an overall working procedure of an artificial intelligence system, and is applicable to a general-purpose requirement in the artificial intelligence field.

The following describes in detail the foregoing overall framework of artificial intelligence from two dimensions: an "intelligent information chain" (horizontal axis) and an "information technology (IT) value chain" (vertical axis).

The "intelligent information chain" reflects a series of processes from obtaining data to processing the data. For example, the process may be a general process of intelligent information perception, intelligent information representation and formation, intelligent inference, intelligent decision-making, and intelligent execution and output. In this process, data undergoes a condensation process of "data→information→knowledge→wisdom".

The "IT value chain" is an industrial ecological process from underlying infrastructure and information (provision and processing of technology implementation) of human intelligence to a system, and reflects value brought by artificial intelligence to the information technology industry.

(1) Infrastructure

The infrastructure provides computing capability support for an artificial intelligence system, implements communication with an external world, and implements support by using a basic platform.

The infrastructure may communicate with the outside by using a sensor, and a computing capability of the infrastructure may be provided by a smart chip.

The smart chip herein may be a hardware acceleration chip such as a central processing unit (CPU), a neural-network processing unit (NPU), a graphics processing unit (GPU), an application-specific integrated circuit (ASIC), or a field programmable gate array (FPGA).

The basic platform of the infrastructure may include related platform assurance and support such as a distributed computing framework and a network, and may include cloud storage and computing, an interconnection network, and the like.

For example, the infrastructure may communicate with the outside by using the sensor to obtain data, and then provide the data for a smart chip in a distributed computing system provided by the basic platform for computing.

(2) Data

Data at an upper layer of the infrastructure is used to indicate a data source in the artificial intelligence field. The data relates to a graph, an image, a voice, and a text, further relates to internet of things data of a conventional device, and includes service data of an existing system and perception data such as force, displacement, a liquid level, a temperature, and humidity.

(3) Data Processing

The data processing usually includes a processing manner such as data training, machine learning, deep learning, searching, inference, or decision-making.

The machine learning and the deep learning may mean performing symbolic and formalized intelligent information modeling, extraction, preprocessing, training, and the like on data.

Inference is a process of performing machine thinking and problem resolving by simulating an intelligent human inference method and using formalized information according to an inference control policy in a computer or an intelligent system. Typical functions are searching and matching.

Decision-making is a process in which a decision is made after intelligent information inference, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, speech recognition, and image recognition.

(5) Smart Product and Industry Application

The smart product and industry application refer to products and applications of an artificial intelligence system in various fields, and are a package of an overall solution of artificial intelligence, to productize decision-making for intelligent information and implement an application. Application fields mainly include smart manufacturing, smart transportation, smart home, smart health care, smart security protection, autonomous driving, a safe city, a smart terminal, and the like.

The embodiments of this application may be applied to many fields of artificial intelligence, for example, fields such as smart manufacturing, smart transportation, smart home, smart health care, smart security protection, autonomous driving, and a safe city.

Specifically, the embodiments of this application may be applied to fields in which a (deep) neural network needs to be used, for example, autonomous driving, image classification, image retrieval, image semantic segmentation, image quality improvement, image super-resolution processing, and natural language processing.

The following briefly describes two application scenarios: album image classification and autonomous driving.

Album image classification:

Specifically, when a user stores a large quantity of images on a terminal device (for example, a mobile phone) or a cloud disk, recognition of images in an album may help the user or a system perform classification management on the album, to improve user experience.

A neural network suitable for album classification is constructed by using a neural network construction method in the embodiments of this application, and then the neural network is trained based on a training image in a training image library, to obtain an album classification neural network. Then, the album classification neural network may be used to classify images, to label images of different categories, so as to facilitate viewing and searching by the user. In addition, classification labels of the images may also be provided for an album management system to perform classification management. This reduces management time of the user, improves album management efficiency, and improves user experience.

Object recognition in an autonomous driving scenario:

During autonomous driving, a large amount of sensor data needs to be processed, and a deep neural network plays a significant role in autonomous driving by virtue of powerful capabilities. However, it is time-consuming and arduous to manually design a corresponding network for data processing. Therefore, a neural network suitable for data processing in the autonomous driving scenario can be constructed by using the neural network construction method in the embodiments of this application. Then, the neural network is trained by using data in the autonomous driving scenario, to obtain a sensor data processing network. Finally, the sensor processing network may be used to process an input road picture, to recognize different objects in the road picture.

Because the embodiments of this application relate to massive application of a neural network, for ease of understanding, the following first describes terms and concepts related to the neural network that may be used in the embodiments of this application.

(1) Neural Network

The neural network may include neurons. The neuron may be an operation unit that uses $x_s$ and an intercept 1 as an input, and an output of the operation unit may be as follows:

$$h_{W,b}(x)=f(W^T x)=f(\Sigma_{s=1}^{n} W_s x_s + b) \quad (1\text{-}1)$$

Herein, $s=1, 2, \ldots,$ or $n$, $n$ is a natural number greater than 1, $W_s$ is a weight of $x_s$, and b is a bias of the neuron. f is an activation function of the neuron, and is used to introduce a non-linear feature into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on locations of different layers, and a neural network in the DNN may be divided into three types: an input layer, a hidden layer, and an output layer. Usually, the first layer is the input layer, the last layer is the output layer, and layers in the middle are all hidden layers. Layers are fully connected. To be specific, any neuron at the $i^{th}$ layer is necessarily connected to any neuron at the $(i+1)^{th}$ layer.

Although the DNN seems to be complex, the DNN is actually not complex in terms of work at each layer, and is simply expressed as the following linear relationship expression: $\vec{y}=\alpha(W\vec{x}+\vec{b})$, where $\vec{x}$ is an input vector, $\vec{y}$ is an output vector, b is a bias vector, W is a weight matrix (also referred to as a coefficient), and $\alpha(\ )$ is an activation function. At each layer, the output vector $\vec{y}$ is obtained by performing such a simple operation on the input vector $\vec{x}$. Because there are a large quantity of layers in the DNN, there are also a relatively large quantity of coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^{3}$. The superscript 3 represents a layer at which the coefficient W is located, and the subscript corresponds to an output third-layer index 2 and an input second-layer index 4.

In conclusion, a coefficient from the $k^{th}$ neuron at the $(L-1)^{th}$ layer to the $j^{th}$ neuron at the $L^{th}$ layer is defined as $W_{jk}^L$.

It should be noted that there is no parameter W at the input layer. In the deep neural network, more hidden layers allow the network more capable of depicting a complex case in the real world. Theoretically, a model having more parameters has higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix including vectors W at many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal in the convolutional neural network. At the convolutional layer in the convolutional neural network, one neuron may be connected to only some adjacent-layer neurons. One convolutional layer usually includes several feature maps, and each feature map may include some rectangularly-arranged neurons. Neurons on a same feature map share a weight. The shared weight herein is a convolution kernel. Weight sharing may be understood as that an image information extraction manner is irrelevant to a location. The convolution kernel may be initialized in a form of a matrix with a random size. In a process of training the convolutional neural network, the convolution kernel may obtain an appropriate weight through learning. In addition, a direct benefit brought by the weight sharing is that connections between layers of the convolutional neural network are reduced and an overfitting risk is lowered.

(4) A recurrent neural network (RNN) is used to process sequence data. In a conventional neural network model, a layer sequence is from an input layer to a hidden layer and then to an output layer, the layers are fully connected, and nodes at each layer are not connected. Such a common neural network resolves many problems, but is still incapable of resolving many other problems. For example, if a word in a sentence is to be predicted, a previous word usually needs to be used, because neighboring words in the sentence are not independent. A reason why the RNN is referred to as the recurrent neural network is that a current output of a sequence is also related to a previous output. A specific representation form is that the network memorizes previous information and applies the previous information to the calculation of a current output. To be specific, nodes at the hidden layer are connected instead of not connected, and an input of the hidden layer not only includes an output of the input layer, but also includes an output of the hidden layer at a previous moment. Theoretically, the RNN can process sequence data of any length. Training for the RNN is the same as training for a conventional CNN or DNN.

A reason why the recurrent neural network is required when there is the convolutional neural network is simple. In the convolutional neural network, it is assumed that elements are independent of each other, and an input and an output are also independent, such as "cat" and "dog". However, in the real world, many elements are interconnected. For example, stocks change with time. For another example, a person says: I like traveling, and my favorite place is Yunnan. I will go if there is a chance. If there is a blank to be filled in herein, people should know that "Yunnan" is the answer. A reason is that people can deduce the answer based on content of the context. However, how can machines do this? The RNN emerges. The RNN is designed to enable a machine to have a memorizing capability like human beings. Therefore, an output of the RNN needs to depend on current input information and historical memory information.

(5) Loss Function

In a process of training a deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, that is, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between a predicted value and a target value" needs to be predefined. This is the loss function or an objective function. The loss function and the objective function are important equations used to measure the difference between the predicted value and the target value. The loss function is used as an example. A larger output value (loss) of the loss function indicates a larger difference, and therefore, training of the deep neural network is a process of reducing the loss as much as possible.

(6) Back Propagation Algorithm

A neural network may correct a value of a parameter in an initial neural network model in a training process by using an error back propagation (BP) algorithm, so that an error loss of reconstructing the neural network model becomes small. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

Figure 2:
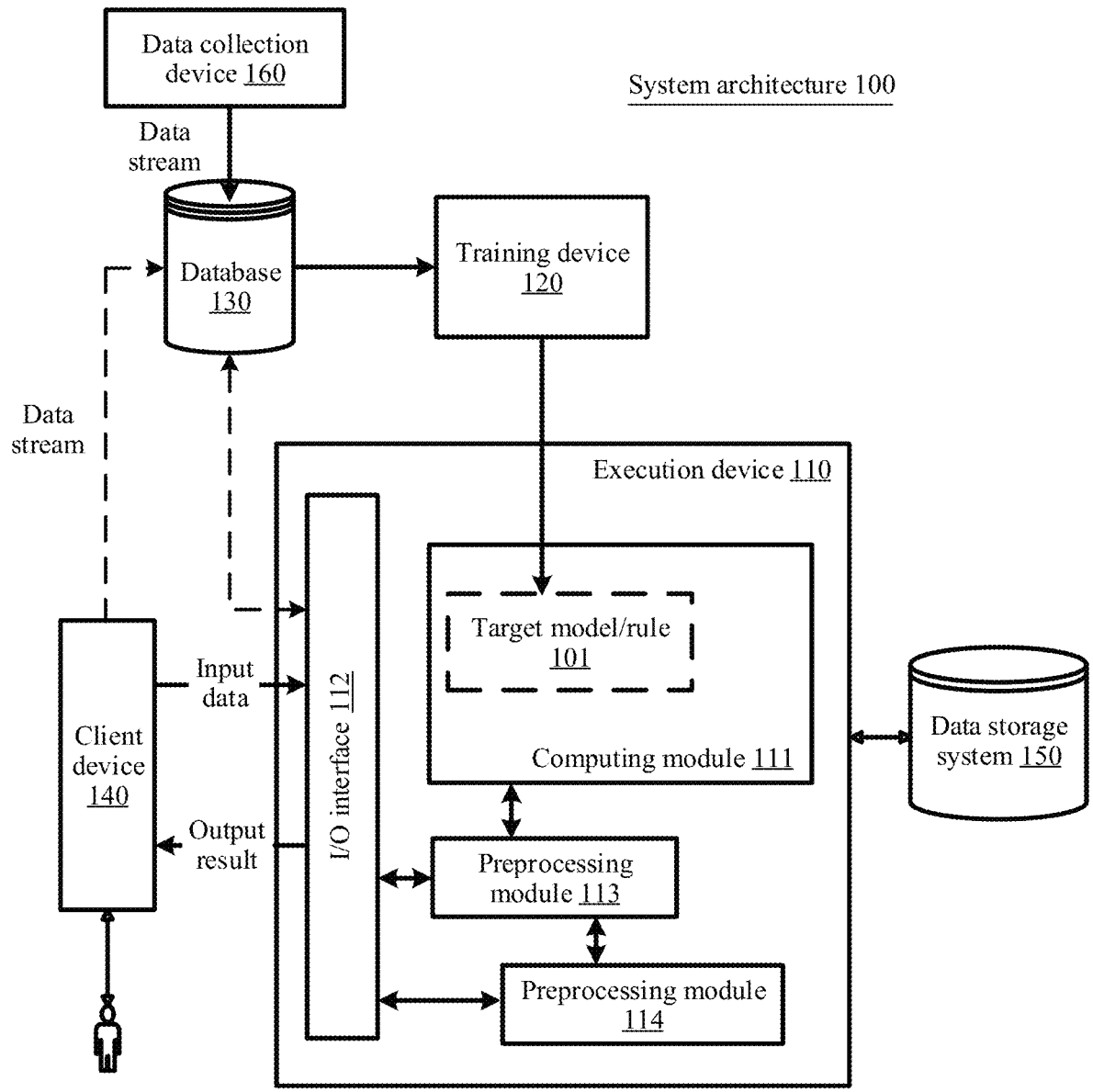
FIG. 2 is a schematic diagram depicting a structure of a system architecture according to an embodiment of this application.

As shown in FIG. 2, an embodiment of this application provides a system architecture 100. In FIG. 2, a data collection device 160 is configured to collect training data. For an image processing method in the embodiments of this application, the training data may include a training image and a classification result corresponding to the training image, and the result corresponding to the training image may be a result of manual pre-labeling.

After collecting the training data, the data collection device 160 stores the training data in a database 130. A training device 120 performs training based on the training data maintained in the database 130, to obtain a target model/rule 101.

The following describes obtaining the target model/rule 101 by the training device 120 based on the training data. The training device 120 processes an input original image, and compares an output image with the original image, until a difference between the image output by the training device 120 and the original image is less than a specific threshold. In this way, training for the target model/rule 101 is completed.

The target model/rule 101 can be used to implement the image processing method in the embodiments of this application. The target model/rule 101 in this embodiment of this application may be specifically a neural network. It should be noted that, in actual application, the training data maintained in the database 130 is not necessarily collected by the data collection device 160, but may be received from another device. In addition, it should be noted that the training device 120 does not necessarily perform training completely based on the training data maintained in the database 130 to obtain the target model/rule 101, but may obtain training data from a cloud or another place to perform model training. The foregoing description shall not be construed as a limitation on this embodiment of this application.

The target model/rule 101 obtained by the training device 120 through training may be applied to different systems or devices, for example, applied to an execution device 110 shown in FIG. 2. The execution device 110 may be a terminal, such as a mobile phone terminal, a tablet computer, a notebook computer, an augmented reality (AR) terminal, a virtual reality (VR) terminal, or a vehicle-mounted terminal, or may be a server, a cloud, or the like. In FIG. 2, the execution device 110 is provided with an input/output (I/O) interface 112, configured to exchange data with an external device. A user may enter data to the I/O interface 112 through a client device 140. The input data in this embodiment of this application may include a to-be-processed image entered through the client device.

A preprocessing module 113 and a preprocessing module 114 are configured to perform preprocessing based on the input data (for example, the to-be-processed image) received by the I/O interface 112. In this embodiment of this application, alternatively, there may be no preprocessing module 113 or preprocessing module 114 (or there may be only one of the preprocessing modules), but a computing module 111 is directly used to process the input data.

In a process in which the execution device 110 preprocesses the input data, or in a process in which the computing module 111 of the execution device 110 performs related processing such as computing, the execution device 110 may invoke data, code, and the like in a data storage system 150 for corresponding processing, and may further store, in the data storage system 150, data, instructions, and the like that are obtained through the corresponding processing.

Finally, the I/O interface 112 returns a processing result, for example, the foregoing obtained image classification result, to the client device 140, to provide the processing result for the user.

It should be noted that the training device 120 may generate corresponding target models/rules 101 for different objectives or different tasks based on different training data. The corresponding target models/rules 101 may be used to implement the foregoing objectives or complete the foregoing tasks, to provide a desired result for the user.

In a case shown in FIG. 2, the user may manually provide the input data. The manual provision may be performed in an interface provided by the I/O interface 112. In another case, the client device 140 may automatically send the input data to the I/O interface 112. If it is required that the client device 140 needs to obtain authorization from the user to automatically send the input data, the user may set corresponding permission on the client device 140. The user may view, on the client device 140, a result that is output by the execution device 110. Specifically, the result may be presented in a form of displaying, a sound, an action, or the like. The client device 140 may also be used as a data collection end to collect the input data entered into the I/O interface 112 and an output result that is output from the I/O interface 112 in the figure, use the input data and the output result as new sample data, and store the new sample data in the database 130. Certainly, the client device 140 may alternatively not perform collection, but the I/O interface 112 directly stores, in the database 130 as new sample data, the input data entered into the I/O interface 112 and an output result that is output from the I/O interface 112 in the figure.

It should be noted that FIG. 2 is merely a schematic diagram depicting a system architecture according to an embodiment of this application. A location relationship between the devices, the components, the modules, and the like shown in the figure does not constitute any limitation. For example, in FIG. 2, the data storage system 150 is an external memory relative to the execution device 110, but in another case, the data storage system 150 may alternatively be disposed in the execution device 110.

As shown in FIG. 2, the target model/rule 101 is obtained through training by the training device 120. In this embodiment of this application, the target model/rule 101 may be a neural network in this application. Specifically, the neural network constructed in the embodiments of this application may be a CNN, a deep convolutional neural network (DCNN), a recurrent neural network (RNN), or the like.

Because the CNN is a very common neural network, a structure of the CNN is described below in detail with reference to FIG. 3. As described in the foregoing basic concepts, the convolutional neural network is a deep neural network with a convolutional structure, and is a deep learning architecture. In the deep learning architecture, multi-layer learning is performed at different abstract levels according to a machine learning algorithm. As a deep learning architecture, the CNN is a feed-forward artificial neural network. Neurons in the feed-forward artificial neural network may respond to an input image.

Figure 3:
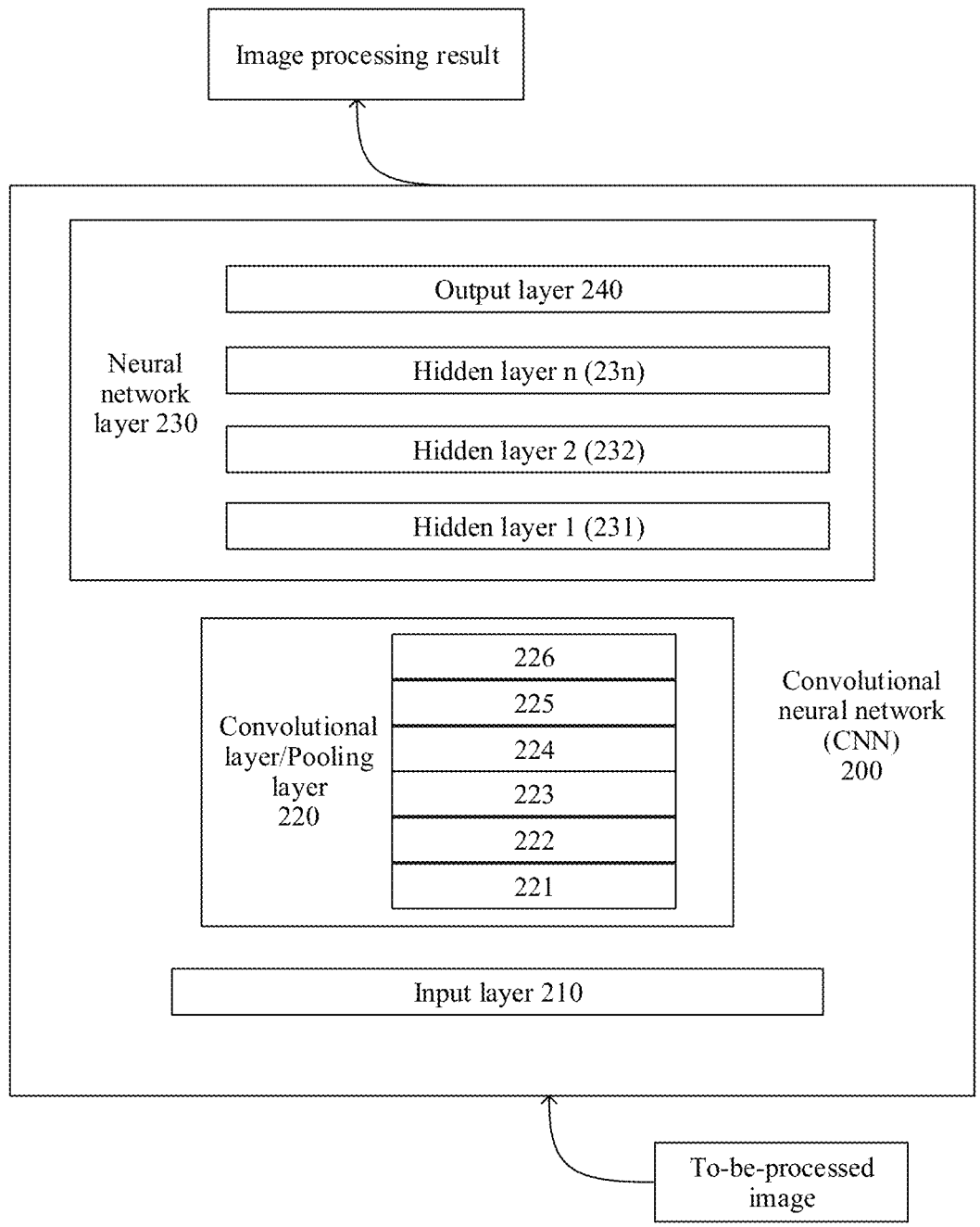
FIG. 3 is a schematic diagram depicting a structure of a convolutional neural network according to an embodiment of this application.

A structure of a neural network specifically used in the image processing method in the embodiments of this application may be shown in FIG. 3. In FIG. 3, a convolutional neural network (CNN) 200 may include an input layer 210, convolutional layers/pooling layers 220 (where the pooling layers are optional), and a neural network layer 230. The input layer 210 may obtain a to-be-processed image, and deliver the obtained to-be-processed image to the convolutional layer/pooling layer 220 and the subsequent neural network layer 230 for processing, to obtain a processing result of the image. The following describes in detail a layer structure inside the CNN 200 in FIG. 3.

Convolutional layer/Pooling layer 220:

Convolutional layer:

As shown in FIG. 3, the convolutional layers/pooling layers 220 may include layers 221 to 226 shown as an example. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. A function of the convolution operator in image processing is equivalent to a filter extracting specific information from an input image matrix. The convolution operator may be essentially a weight matrix, and the weight matrix is usually predefined. In a process of performing a convolution operation on an image, the weight matrix is usually processed by pixels one by one (or pixels two by two, which depends on a value of a stride) along a horizontal direction on the input image, to extract a specific feature from the image. A size of the weight matrix needs to be related to a size of the image. It should be noted that a depth dimension of the weight matrix is the same as that of the input image. In a convolution operation process, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows x columns), namely, a plurality of same-type matrices, are used. Outputs of the weight matrices are stacked to form a depth dimension of a convolutional image. The dimension herein may be understood as being determined based on the foregoing "a plurality of". Different weight matrices may be used to extract different features from an image. For example, one weight matrix is used to extract edge information of the image, another weight matrix is used to extract a specific color of the image, and still another weight matrix is used to blur unneeded noise in the image. The plurality of weight matrices have the same size (rows x columns). Sizes of convolutional feature maps extracted by using the plurality of weight matrices with the same size are also the same, and then the plurality of extracted convolutional feature maps with the same size are combined to form an output of the convolution operation.

Weight values in these weight matrices need to be obtained through massive training in actual application. Each weight matrix including weight values obtained through training may be used to extract information from an input image, to enable the convolutional neural network 200 to perform correct prediction.

When the convolutional neural network 200 has a plurality of convolutional layers, an initial convolutional layer (for example, the layer 221) usually extracts a relatively large quantity of general features. The general features may also be referred to as low-level features. As a depth of the convolutional neural network 200 increases, a feature extracted from a latter convolutional layer (for example, the layer 226) is more complex, for example, a feature such as high-level semantics. A feature with higher-level semantics is more applicable to a to-be-resolved problem.

Pooling layer:

A quantity of training parameters often needs to be reduced. Therefore, the pooling layer often needs to be periodically introduced after the convolutional layer. For the layers 221 to 226 shown in 220 in FIG. 3, one convolutional layer may be followed by one pooling layer, or a plurality of convolutional layers may be followed by one or more pooling layers. During image processing, the pooling layer is used only to reduce a space size of an image. The pooling layer may include an average pooling operator and/or a maximum pooling operator, to perform sampling on an input image to obtain a small-size image. The average pooling operator may be used to calculate an average value of pixel values in an image within a specific range. The average value is used as an average pooling result. The maximum pooling operator may be used to select a pixel with a maximum value within a specific range as a maximum pooling result. In addition, similar to that, a size of a weight matrix at the convolutional layer needs to be related to a size of an image, an operator at the pooling layer also needs to be related to a size of an image. A size of a processed image that is output from the pooling layer may be less than a size of an image entered into the pooling layer. Each pixel in the image that is output from the pooling layer represents an average value or a maximum value of a corresponding sub-region of the image entered into the pooling layer.

Neural network layer 230:

After processing performed by the convolutional layer/pooling layer 220, the convolutional neural network 200 is not ready to output required output information. A reason is as follows: As described above, at the convolutional layer/pooling layer 220, only a feature is extracted, and parameters resulting from an input image are reduced. However, to generate final output information (required type information or other related information), the convolutional neural network 200 needs to use the neural network layer 230 to generate one output or a group of outputs with a quantity of required types. Therefore, the neural network layer 230 may include a plurality of hidden layers (231, 232, ..., and 23$n$ shown in FIG. 3) and an output layer 240. Parameters included in the plurality of hidden layers may be obtained through pre-training based on related training data of a specific task type. For example, the task type may include image recognition, image classification, super-resolution image reconstruction, and the like.

At the neural network layer 230, the plurality of hidden layers are followed by the output layer 240, namely, the last layer of the entire convolutional neural network 200. The output layer 240 has a loss function similar to classification cross entropy, and the loss function is specifically used to calculate a prediction error. Once forward propagation (as shown in FIG. 3, propagation in a direction from 210 to 240 is forward propagation) of the entire convolutional neural network 200 is completed, back propagation (as shown in FIG. 3, propagation in a direction from 240 to 210 is back propagation) is started to update a weight value and a deviation of each layer mentioned above, to reduce a loss of the convolutional neural network 200 and an error between a result that is output by the convolutional neural network 200 through the output layer and an ideal result.

Figure 4:
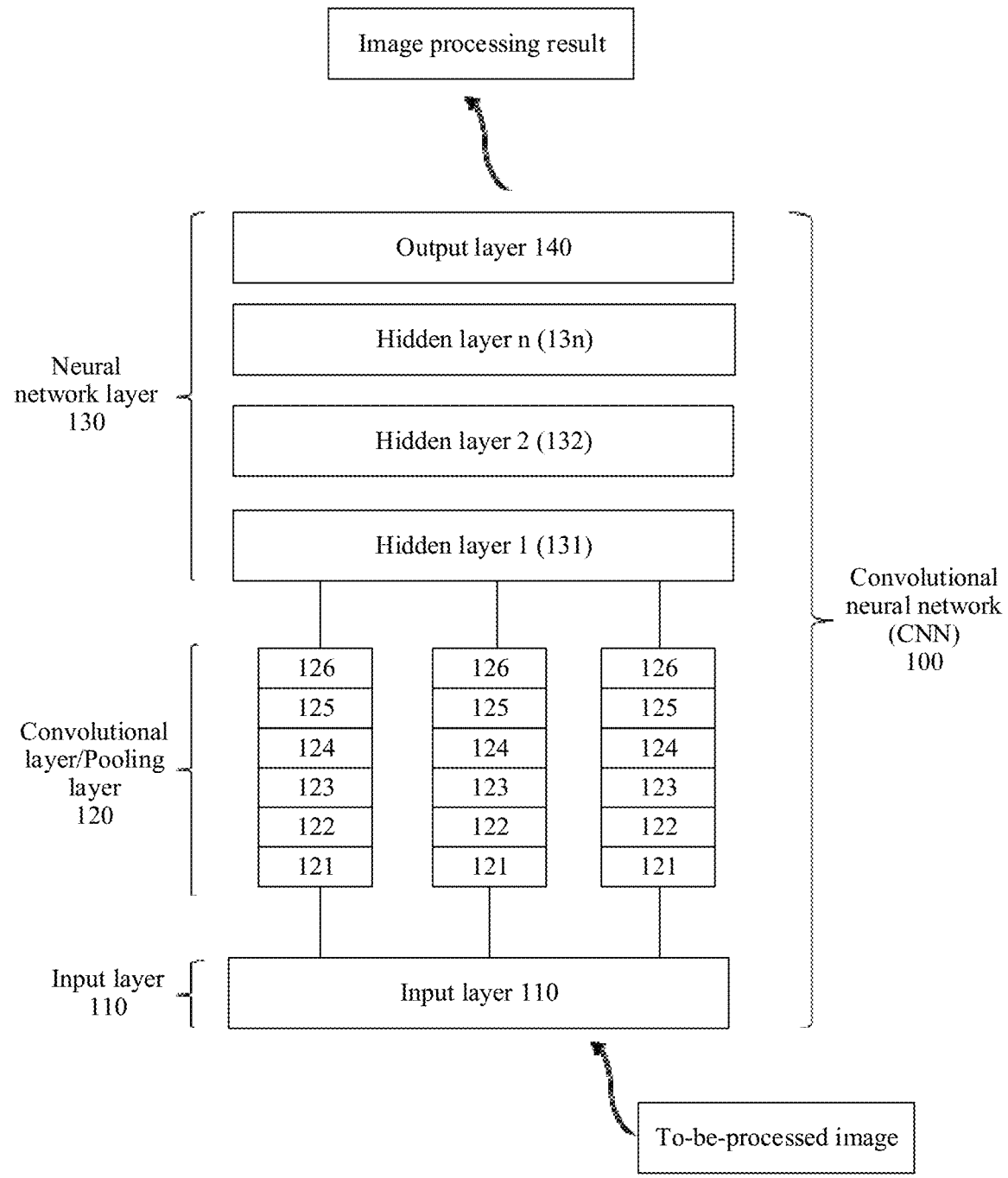
FIG. 4 is a schematic diagram depicting a structure of another convolutional neural network according to an embodiment of this application.

A structure of a neural network specifically used in the image processing method in the embodiments of this application may be shown in FIG. 4. In FIG. 4, a convolutional neural network (CNN) 100 may include an input layer 110, convolutional layers/pooling layers 120 (where the pooling layers are optional), and a neural network layer 130. Compared with those in FIG. 3, a plurality of convolutional layers/pooling layers in the convolutional layers/pooling layers 120 in FIG. 4 are in parallel, and all separately extracted features are input to the neural network layer 130 for processing.

It should be noted that the convolutional neural network shown in FIG. 3 and the convolutional neural network shown in FIG. 4 are merely used as examples of two possible convolutional neural networks used in the image processing method in the embodiments of this application. In specific application, the convolutional neural network used in the image processing method in the embodiments of this application may alternatively exist in a form of another network model.

In addition, a structure of a convolutional neural network obtained by using the neural network structure search method in the embodiments of this application may be the structure of the convolutional neural network shown in FIG. 3 or FIG. 4.

Figure 5:
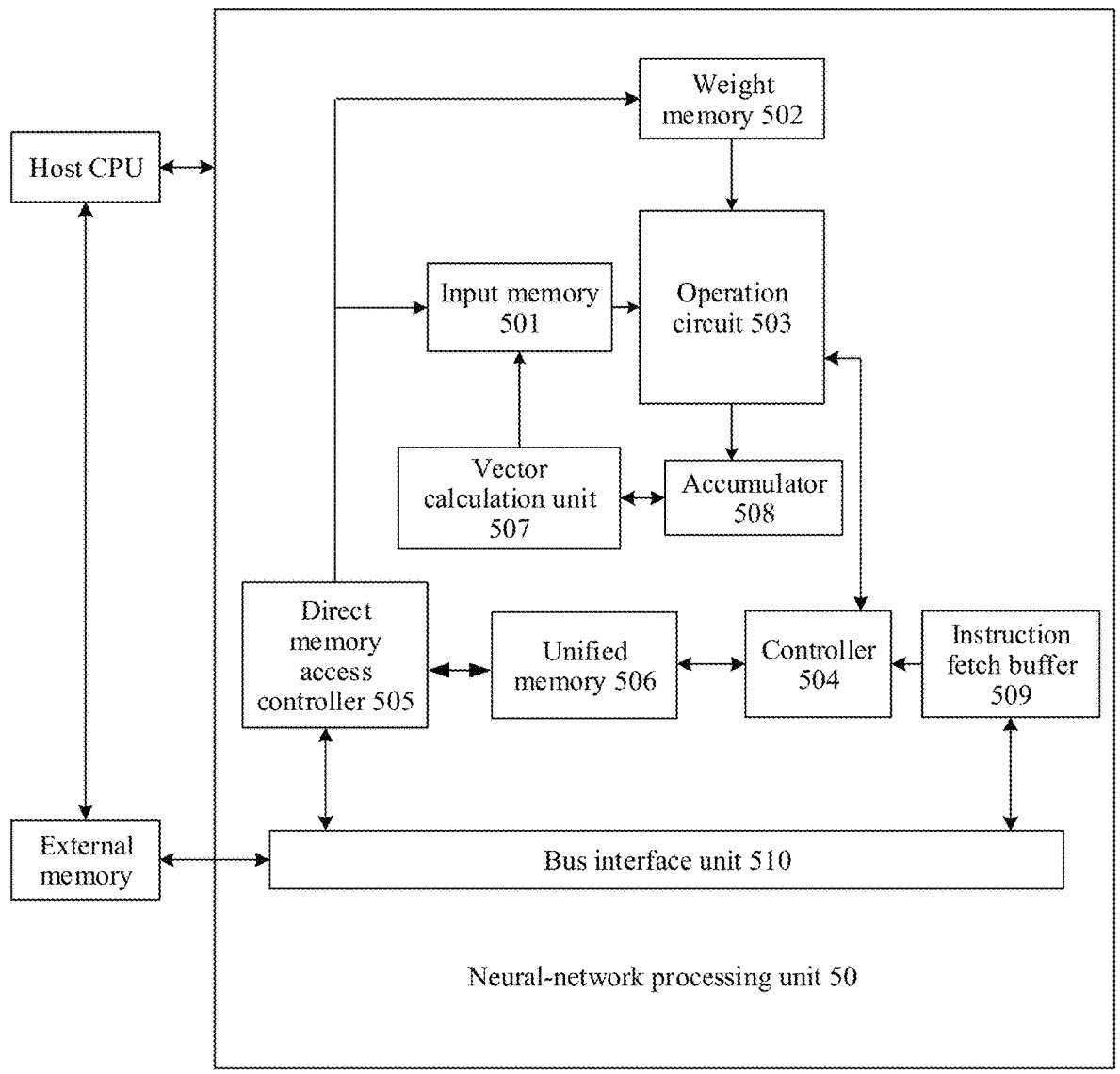
FIG. 5 is a schematic diagram depicting a hardware structure of a chip according to an embodiment of this application.

FIG. 5 shows a hardware structure of a chip according to an embodiment of this application. The chip includes a neural-network processing unit 50. The chip may be disposed in the execution device 110 shown in FIG. 1, to complete computing work of the computing module 111. The chip may be alternatively disposed in the training device 120 shown in FIG. 1, to complete training work of the training device 120 and output the target model/rule 101. Algorithms at all layers of the convolutional neural network shown in FIG. 3 or FIG. 4 may be implemented on the chip shown in FIG. 5.

The neural-network processing unit NPU 50 serves as a coprocessor, and is mounted onto a host central processing unit (CPU) (host CPU). The host CPU assigns a task. A core part of the NPU is an operation circuit 503, and a controller 504 controls the operation circuit 503 to extract data in a memory (a weight memory or an input memory) and perform an operation.

In some implementations, the operation circuit 503 internally includes a plurality of process engines (PE). In some implementations, the operation circuit 503 is a two-dimensional systolic array. The operation circuit 503 may alternatively be a one-dimensional systolic array or another electronic circuit that can perform mathematical operations such as multiplication and addition. In some implementations, the operation circuit 503 is a general-purpose matrix processor.

For example, it is assumed that there is an input matrix A, a weight matrix B, and an output matrix C. The operation circuit fetches data corresponding to the matrix B from a weight memory 502 and buffers the data on each PE of the operation circuit. The operation circuit fetches data of the matrix A from an input memory 501, to perform a matrix operation on the matrix B, and stores an obtained partial result or an obtained final result of the matrix into an accumulator 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling, batch normalization, or local response normalization, at a non-convolutional/non-FC layer in a neural network.

In some implementations, the vector calculation unit 507 can store a processed output vector in a unified cache 506. For example, the vector calculation unit 507 may apply a non-linear function to the output of the operation circuit 503, for example, a vector of an accumulated value, to generate an activation value. In some implementations, the vector calculation unit 507 generates a normalized value, a combined value, or both a normalized value and a combined value. In some implementations, the processed output vector can be used as an activation input of the operation circuit 503, for example, can be used at a subsequent layer in the neural network.

The unified memory 506 is configured to store input data and output data.

For weight data, a direct memory access controller (DMAC) 505 transfers input data in an external memory to the input memory 501 and/or the unified memory 506, stores weight data in the external memory into the weight memory 502, and stores data in the unified memory 506 into the external memory.

A bus interface unit (BIU) 510 is configured to implement interaction among the host CPU, the DMAC, and an instruction fetch buffer 509 through a bus.

The instruction fetch buffer 509 connected to the controller 504 is configured to store instructions used by the controller 504.

The controller 504 is configured to invoke the instructions buffered in the instruction fetch buffer 509, to control a working process of the operation accelerator.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM for short), a high bandwidth memory (HBM), or another readable and writable memory.

Operations at the layers in the convolutional neural network shown in FIG. 3 or FIG. 4 may be performed by the operation circuit 503 or the vector calculation unit 507.

The foregoing described execution device 110 in FIG. 2 can perform steps of the image processing method in the embodiments of this application. The CNN models shown in FIG. 3 and FIG. 4 and the chip shown in FIG. 5 may also be configured to perform the steps of the image processing method in the embodiments of this application. The following describes in detail the neural network construction method in the embodiments of this application and the image processing method in the embodiments of this application with reference to the accompanying drawings.

Figure 6:
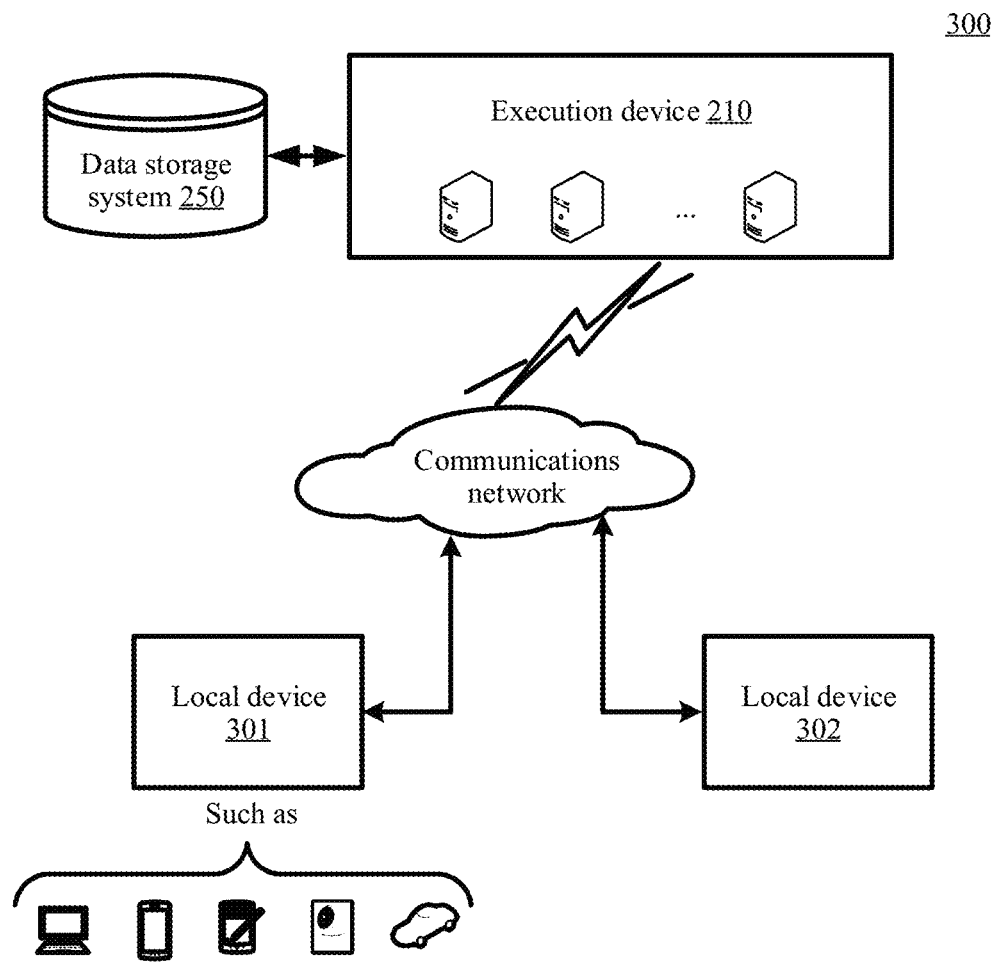
FIG. 6 is a schematic diagram depicting a system architecture according to an embodiment of this application.

As shown in FIG. 6, an embodiment of this application provides a system architecture 300. The system architecture includes a local device 301, a local device 302, an execution device 210, and a data storage system 250. The local device 301 and the local device 302 are connected to the execution device 210 by using a communications network.

The execution device 210 may be implemented by one or more servers. Optionally, the execution device 210 may cooperate with another computing device, for example, a device such as a data memory, a router, or a load balancer. The execution device 210 may be disposed on one physical site, or distributed on a plurality of physical sites. The execution device 210 may implement the neural network construction method in the embodiments of this application by using data in the data storage system 250 or by invoking program code in the data storage system 250.

Specifically, the execution device 210 may perform the following process: constructing a search space based on an application requirement of a target neural network; clustering a plurality of elements in the search space to obtain a clustering result; selecting, based on the clustering result, a target network structure that satisfies a preset requirement from a plurality of network structures indicated by the plurality of elements; and constructing the target neural network based on the target network structure.

The execution device 210 can construct the target neural network through the foregoing process, and the target neural network may be used for image classification, image processing, or the like.

Users may operate respective user equipment (for example, the local device 301 and the local device 302) to interact with the execution device 210. Each local device may be any computing device, such as a personal computer, a computer workstation, a smartphone, a tablet computer, an intelligent camera, a smart automobile, another type of cellular phone, a media consumption device, a wearable device, a set-top box, or a game console.

A local device of each user may interact with the execution device 210 through a communications network of any communications mechanism/communications standard. The communications network may be a wide area network, a local area network, a point-to-point connection, or any combination thereof.

In an implementation, the local device 301 and the local device 302 obtain a related parameter of the target neural network from the execution device 210, deploy the target neural network on the local device 301 and the local device 302, and perform image classification, image processing, or the like by using the target neural network.

In another implementation, the target neural network may be directly deployed on the execution device 210. The execution device 210 obtains to-be-processed images from the local device 301 and the local device 302, and performs classification or another type of image processing on the to-be-processed images based on the target neural network.

Alternatively, the execution device 210 may be a cloud device. In this case, the execution device 210 may be deployed in the cloud. Alternatively, the execution device 210 may be a terminal device. In this case, the execution device 210 may be deployed on a user terminal side. This is not limited in this embodiment of this application.

A neural network construction method 700 in an embodiment of this application is first described in detail below with reference to FIG. 7. The method shown in FIG. 7 may be performed by a neural network construction apparatus. The neural network construction apparatus may be an apparatus that has a sufficient computing capability to construct a neural network, for example, a mobile terminal, a computer, or a server.

Figure 7:
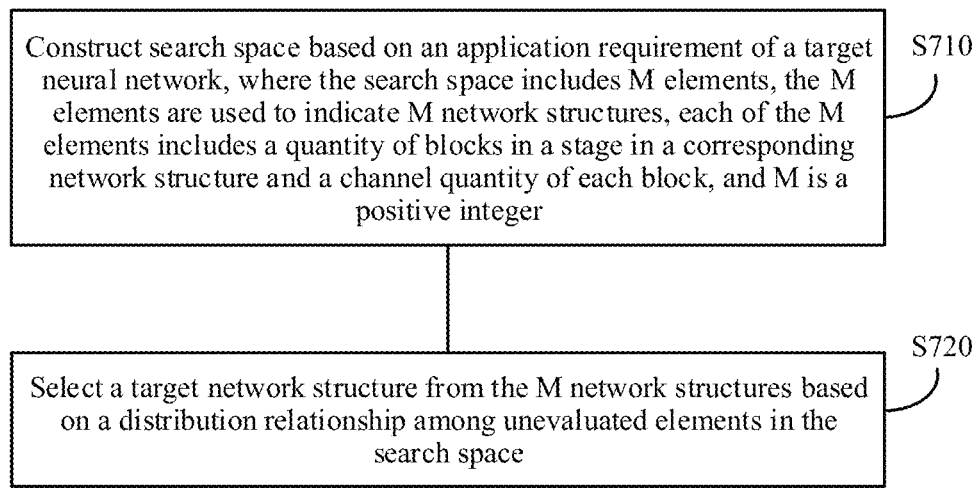
FIG. 7 is a schematic flowchart depicting a neural network construction method according to an embodiment of this application.

The method shown in FIG. 7 includes steps 710, 720. The following separately describes these steps in detail.

S710: Construct a search space based on an application requirement of a target neural network.

The search space may include M elements, the M elements may be used to indicate M network structures, each of the M elements may include a quantity of stages in a corresponding network structure, a quantity of blocks in the stage, and/or a channel quantity of each block, and M is a positive integer.

Optionally, the network structure corresponding to each of the M elements is a network structure indicated by each of the M elements.

Correspondingly, each of the M elements includes a quantity of stages in the network structure indicated by the element, a quantity of blocks in the stage, and/or a channel quantity of each block.

The target neural network may be a deep neural network. For ease of description, in this embodiment of this application, a convolutional neural network is used as an example for description.

In this embodiment of this application, the network structure may include some stages in the convolutional neural network. For example, the network structure may refer to a part that a user expects to adjust (or referred to as a to-be-adjusted part) in the convolutional neural network. Therefore, the network structure may also be referred to as a to-be-adjusted network structure.

It should be noted that, in this embodiment of this application, precision of a network structure may be precision (or accuracy) of a neural network constructed by using the network structure.

The target neural network may be constructed by using at least one network structure. The network structure may include one or more stages, and each stage may include at least one block.

The block may include basic atomic units in the convolutional neural network. These basic atomic units include a convolutional layer, a pooling layer, a fully connected layer, a non-linear activation layer, and the like.

In the convolutional neural network, a feature usually exists in a three-dimensional form (length, width, and depth). One feature may be considered as superimposition of a plurality of two-dimensional features, and each two-dimensional feature of the feature may be referred to as a feature map. Alternatively, a feature map (two-dimensional feature) of the feature may be referred to as a channel of the feature.

The length and the width of the feature map may also be referred to as resolution of the feature map.

Optionally, quantities of blocks in different stages may be different.

Similarly, input feature maps processed in different stages may have different resolution, and output feature maps may have different resolution.

Optionally, channel quantities of blocks in different stages may be different. It should be understood that a channel quantity of a block may also be referred to as the width of the block. This is not limited in this embodiment of this application.

Similarly, input feature maps processed on different blocks may have different resolution, and output feature maps may have different resolution.

In this embodiment of this application, the element may further include resolution of an input feature map in the stage, resolution of an output feature map in the stage, resolution of an input feature map on the block, and/or resolution of an output feature map on the block.

A variation of these parameters (of the convolutional neural network) included in the element directly affects an effect, a speed, and the like of the convolutional neural network. Therefore, in this embodiment of this application, the search space may be constructed for these parameters based on the application requirement of the target neural network, and a target network structure satisfying a preset requirement is selected in the search space.

In this embodiment of this application, the application requirement of the target neural network may include a running speed of the target neural network, a parameter quantity of the target neural network, or a structure requirement of the target neural network, and the structure requirement includes a quantity of stages in the target neural network, a quantity of blocks in each stage, and/or a channel quantity of each block.

Optionally, the search space may be constructed based on the running speed of the target neural network and/or the parameter quantity of the target neural network. The search space may include all possible network structures that satisfy the application requirement of the target neural network.

In this embodiment of this application, the search space is constructed based on the running speed of the target neural network and/or the parameter quantity of the target neural network, and some low-performance network structures may be screened out in a process of constructing the search space, so that neural network construction efficiency can be improved.

Optionally, the application requirement of the target neural network may further include a structure requirement of the network structure.

Optionally, the structure requirement of the network structure may include a requirement on a quantity of stages in the network structure. The requirement on the quantity of stages herein may be a value range of the quantity of stages. For example, a quantity of stages allowed in the network structure is between 2 and 5. Alternatively, the requirement on the quantity of stages may be a specific quantity of stages. For example, there are four stages in the network structure.

Similarly, the structure requirement of the network structure may further include a requirement on a quantity of blocks in each stage and/or a requirement on a channel quantity of each block.

In this case, the search space may be constructed based on the running speed of the target neural network, the parameter quantity of the target neural network, the requirement on the quantity of stages in the network structure, the requirement on the quantity of blocks in each stage, and/or the requirement on the channel quantity of the block. The search space may include all possible network structures that satisfy the application requirement of the target neural network.

In this embodiment of this application, the search space may be constructed based on an existing neural network, and a target network structure satisfying a preset requirement is selected in the search space.

For example, in this embodiment of this application, the search space may be constructed based on existing ResNets, and the target network structure satisfying the preset requirement is selected in the search space.

Figure 8:
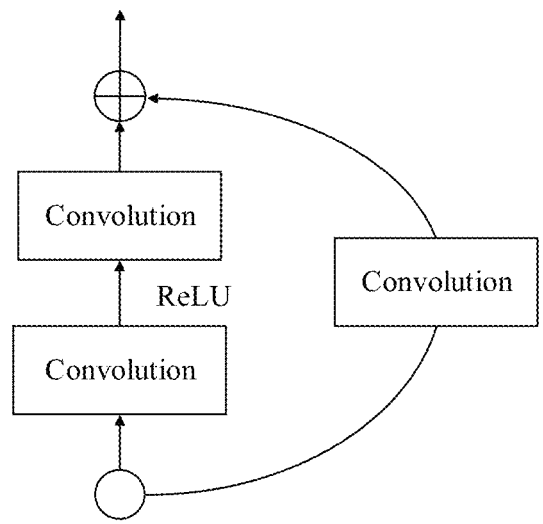
FIG. 8 is a schematic block diagram depicting a residual block according to an embodiment of this application.

Optionally, in the ResNets, a neural network may be divided into six stages based on resolution of an output feature map. The first stage includes only one convolution operation, and probability regression is performed based on a full connection operation in the last stage. The second to the fifth stages each are formed by stacking one or more residual blocks. A structure of the residual block may be shown in FIG. 8.

For specific descriptions of network structures and residual blocks of the ResNets, refer to the conventional technology. Details are not described in this embodiment of this application.

For example, in this embodiment of this application, the second to the fifth stages of the ResNets may be used as a to-be-adjusted network structure, search space is constructed based on the network structure, and it is specified that channel quantities of blocks in each stage are the same.

It should be noted that the quantity of stages and the channel quantity of the block in this embodiment of this application are merely examples rather than limitations. In practice, a quantity of stages in the to-be-adjusted network structure is not limited to 4, and the channel quantities of the blocks in each stage are not limited to being the same. The structure requirement of the network structure may be determined based on a specific application requirement. This is not limited in this embodiment of this application.

By way of example rather than limitation, after it is determined that the quantity of stages in the to-be-adjusted network structure is 4 (that is, the second to the fifth stages of the ResNets), actually only quantities of blocks in the four stages and channel quantities of the blocks need to be adjusted. An octet may be used to encode the network structure. For ease of description, the octet may be referred to as a block connection style code (BCSC). Specifically, the network structure may be encoded as follows:

$$BCSC=\{D_2,D_3,D_4,D_5,C_2,C_3,C_4,C_5\}.$$

Herein, $D_2$ represents a quantity of blocks in the second stage, $D_3$ represents a quantity of blocks in the third stage, $D_4$ represents a quantity of blocks in the fourth stage, $D_5$ represents a quantity of blocks in the fifth stage, $C_2$ represents a channel quantity of a block in the second stage, $C_3$ represents a channel quantity of a block in the third stage, $C_4$ represents a channel quantity of a block in the fourth stage, and $C_5$ represents a channel quantity of a block in the fifth stage.

It should be understood that the BCSC (octet) encoding manner is merely an example rather than a limitation. In this embodiment of this application, another existing encoding manner may alternatively be used to encode the network structure.

In this embodiment of this application, the M elements in the search space may be M BCSCs, and each BCSC may indicate one network structure.

In a possible implementation, all the M possible network structures may be determined based on the application requirement of the target neural network, and each network structure is encoded by using a BCSC, to obtain the M BCSCs. In this case, the M BCSCs may be used as the M elements, to form the search space.

In another possible implementation, N possible network structures may be determined based on the application requirement of the target neural network. Correspondingly, an initial search space including N BCSCs may be obtained. In this case, screening may be performed on the initial search space, and after a low-performance network structure is screened out, the search space including the M elements is obtained. For details, refer to the following description of a method 900 in FIG. 9.

Optionally, the initial search space may be constructed based on the application requirement of the target neural network, where the initial search space includes N initial elements, the N initial elements are used to indicate N initial network structures, each of the N initial elements includes a quantity of stages in a corresponding initial network structure, a quantity of blocks in the stage, and/or a channel quantity of each block, and N is a positive integer greater than or equal to M; and screening may be performed, according to a preset rule, on the N initial network structures indicated by the N initial elements, to obtain the M elements in the search space.

The preset rule may include:
  if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

It can be learned from the foregoing preset rule that, if a network structure that is the same as the second initial network structure can be obtained by performing the following operations on the first initial network structure several times, it indicates that precision of the second initial network structure is higher than precision of the first initial network structure. Correspondingly, the first initial element may be deleted from the initial search space. Specific operations include the following.

(1) Duplicate one block in one stage.

(2) Increase a channel quantity (or width) of one block in one stage.

Figure 10:
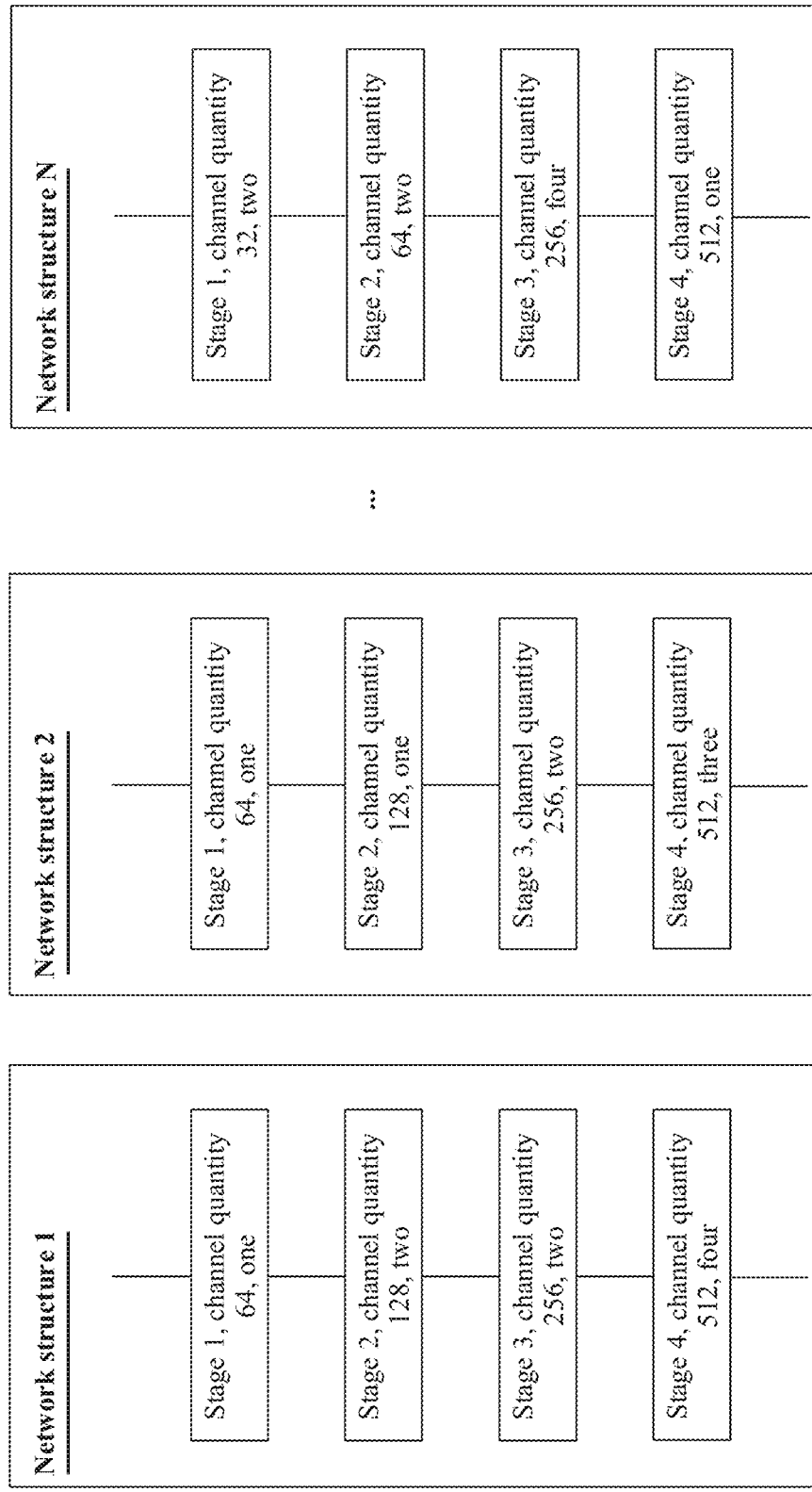
FIG. 10 is a schematic block diagram depicting network structures in search space according to an embodiment of this application.

For example, FIG. 10 shows N network structures, where N is a positive integer greater than 1. In a network structure 1, a stage 1 includes one block, and a channel quantity of each block is 64; a stage 2 includes two blocks, and a channel quantity of each block is 128; a stage 3 includes two blocks, and a channel quantity of each block is 256; a stage 4 includes four blocks, and a channel quantity of each block is 512. In a network structure 2, a stage 1 includes one block, and a channel quantity of each block is 64; a stage 2 includes one blocks, and a channel quantity of each block is 128; a stage 3 includes two blocks, and a channel quantity of each block is 256; a stage 4 includes three blocks, and a channel quantity of each block is 512.

It can be learned from FIG. 10 that, if one block in the stage 2 and one block in the stage 4 in the network structure 2 are duplicated, the stage 2 includes two blocks whose channel quantities are 128, and the stage 4 includes four blocks whose channel quantities are 512. In this case, a network structure 2 obtained after the duplication is the same as the network structure 1. This indicates that precision of the network structure 2 is lower than that of the network structure 1, and the network structure 2 (that is, an element corresponding to the network structure 2) may be deleted from the initial search space.

Alternatively, two initial elements in the initial search space may be directly compared.

For example, a BCSC of the first initial element may be directly compared with a BCSC of the second initial element. When each element in the BCSC of the first initial element is less than a corresponding element in the BCSC of the second initial element, it indicates that precision of the first initial network structure is lower than precision of the second initial network structure. Correspondingly, the first initial element may be deleted from the initial search space.

In this embodiment of this application, according to the foregoing preset rule, when the initial network structures indicated by the N initial elements in the initial search space are not trained, a low-performance network structure in the N initial network structures can be screened out based on only structure information of the N initial network structures. Therefore, neural network construction efficiency can be improved.

S720: Select a target network structure from the M network structures based on a distribution relationship among unevaluated elements in the search space.

The distribution relationship among the unevaluated elements may be a clustering result of the unevaluated elements.

In this embodiment of this application, a representative element in the unevaluated elements may be conveniently selected based on the distribution relationship among the unevaluated elements. In this case, the target network structure can be efficiently selected from the M network structures based on the representative element, so that a neural network satisfying a performance requirement can be efficiently constructed.

Optionally, a candidate set is determined based on the distribution relationship among the unevaluated elements, and the candidate set may include the selected representative element in the unevaluated elements.

It should be noted that the following method for determining the candidate set is merely an example rather than a limitation. In this embodiment of this application, the candidate set may alternatively be determined by using another method. A specific method for determining the candidate set based on the distribution relationship among the unevaluated elements is not limited in this embodiment of this application.

For example, in this embodiment of this application, the candidate set (including the representative element in the unevaluated elements) may be obtained based on the distribution relationship among the unevaluated elements in the following several manners.

Manner 1:

One candidate set (of the unevaluated elements) may be constructed, and a distance between elements in the candidate set is made as long as possible. In this way, the elements in the set can be distributed as dispersed as possible in the unevaluated elements, so that the representative element in the unevaluated elements can be selected.

For example, the candidate set may be obtained by using the following method:

(1) Initialize each set, where a set $\mathcal{A}$ is an empty set, a set $\mathcal{B}$ is a set including all unevaluated elements, and T is a positive integer.

(2) Randomly select an element β from the set $\mathcal{O}$, add the element β to the set $\mathcal{B}$, and remove the element β from the set $\mathcal{O}$.

(3) For any element $β_i$ in the set $\mathcal{O}$, calculate a shortest distance between the element $β_i$ and an element in the set $\mathcal{B}$, where the shortest distance is denoted as $dis_i$.

(4) Select a smallest value in a set $\{dis_i|i=1,2,3,\ldots\}$, where the smallest value is denoted as $dis_j$, and an element corresponding to $dis_j$ in the set $\mathcal{O}$ is denoted as an element $β_j$.

(5) Add the element $β_j$ to the set $\mathcal{A}$, and remove the element $β_j$ from the set $\mathcal{O}$.

(6) If a quantity of elements in the set $\mathcal{A}$ is greater than T, perform step (7); or if a quantity of elements in the set $\mathcal{A}$ is not greater than T, perform step (3) for iteration.

(7) Use the set $\mathcal{A}$ as the candidate set, where one or more elements may be subsequently selected from the set $\mathcal{A}$ for evaluation.

Manner 2:

One candidate set (of the unevaluated elements) may be constructed, and each element in the candidate set is centered (as much as possible) on a subset (in which the element is located) of the unevaluated elements.

For example, the candidate set may be obtained by using the following method:

(1) Initialize each set, where a set $\mathbb{E}$ is an empty set, a set $\mathcal{O}$ is a set including all unevaluated elements, and K is a positive integer.

(2) For any element $β_i$ in the set $\mathcal{O}$, calculate K neighbors of the element $β_i$ in the set $\mathcal{O}$ (that is, K elements closest to the element $β_i$ in the set $\mathcal{O}$), where the K neighbors are denoted as $\{\mathcal{N}_{i,1}, \mathcal{N}_{i,2}, \ldots, \mathcal{N}_{i,K}\}$, and i and K are positive integers.

(3) For any element $β_i$ in the set $\mathcal{O}$, calculate a shortest distance between the element $β_j$ and an element in $\{\mathcal{N}_{i,1}, \mathcal{N}_{i,2}, \ldots, \mathcal{N}_{i,K}\}$, where the shortest distance is denoted as $dis_i$.

(4) Select a smallest value in a set $\{dis_i|i=1,2,3,\ldots\}$, where the smallest value is denoted as $dis_j$, and an element corresponding to $dis_j$ in the set $\mathcal{O}$ is denoted as an element $β_j$.

(5) Add the element $\beta_j$ to the set $\mathcal{B}$, and remove $\{\mathcal{N}_{j,1}, \mathcal{N}_{j,2}, \ldots, \mathcal{N}_{j,K}\}$ from the set $\mathcal{O}$.

(6) If a quantity of elements in the set $\mathcal{O}$ is less than K, perform step (7); or if a quantity of elements in the set $\mathcal{O}$ is not less than K, perform step (2) for iteration.

(7) Use the set $\mathbb{E}$ as the candidate set, where one or more elements may be subsequently selected from the set $\mathbb{E}$ for evaluation.

Manner 3:

The unevaluated elements may be clustered to obtain a clustering result of the unevaluated elements (the clustering result of the unevaluated elements may also be considered as the distribution relationship among the unevaluated elements), and the representative element, that is, the candidate set, in the unevaluated elements is selected based on the clustering result of the unevaluated elements.

For ease of understanding, in the following embodiment, an example in which the candidate set is selected in a manner of clustering (the unevaluated elements) is used for description.

Optionally, the unevaluated elements in the search space may be clustered to obtain the clustering result of the unevaluated elements, and then the target network structure is selected from the M network structures based on the clustering result of the unevaluated elements.

In this embodiment of this application, before the M elements are clustered, the M elements (that is, the M BCSCs) may be first standardized. For a specific standardization process, refer to the conventional technology. This is not limited in this application.

Optionally, means and variances of the M BCSCs in all dimensions may be collected.

For example, the means in all the dimensions may be denoted as $\{\mu_{D_2}, \mu_{D_3}, \mu_{D_4}, \mu_{D_5}, \mu_{D_2}, \mu_{D_3}, \mu_{D_4}, \mu_{D_5}\}$. Herein, $\mu_{D_2}$ represents a mean of quantities of blocks in the second stage, $\mu_{D_3}$ represents a mean of quantities of blocks in the third stage, $\mu_{D_4}$ represents a mean of quantities of blocks in the fourth stage, $\mu_{D_5}$ represents a mean of quantities of blocks in the fifth stage, $\mu_{C_2}$ represents a mean of channel quantities of blocks in the second stage, $\mu_{C_3}$ represents a mean of channel quantities of blocks in the third stage, $\mu_{C_4}$ represents a mean of channel quantities of blocks in the fourth stage, and $\mu_{C_5}$ represents a mean of channel quantities of blocks in the fifth stage.

Similarly, the variances in all the dimensions may be denoted as $\{\mu_{D_2}, \mu_{D_3}, \mu_{D_4}, \mu_{D_5}, \mu_{D_2}, \mu_{D_3}, \mu_{D_4}, \mu_{D_5}\}$. Herein, $\sigma_{D_2}$ represents a variance of quantities of blocks in the second stage, $\sigma_{D_3}$ represents a variance of quantities of blocks in the third stage, $\sigma_{D_4}$ represents a variance of quantities of blocks in the fourth stage, $\sigma_{D_5}$ represents a variance of quantities of blocks in the fifth stage, $\sigma_{C_2}$ represents a variance of channel quantities of blocks in the second stage, $\sigma_{C_3}$ represents a variance of channel quantities of blocks in the third stage, $\sigma_{C_4}$ represents a variance of channel quantities of blocks in the fourth stage, and $\sigma_{C_5}$ represents a variance of channel quantities of blocks in the fifth stage.

For each BCSC=$\{D_2, D_3, D_4, D_5, C_2, C_3, C_4, C_5\}$ $$\overline{BCSC} = \left\{ \frac{D_2 - \mu_{D_2}}{\sigma_{D_2}}, \frac{D_3 - \mu_{D_3}}{\sigma_{D_3}}, \frac{D_4 - \mu_{D_4}}{\sigma_{D_4}}, \frac{D_5 - \mu_{D_5}}{\sigma_{D_5}}, \frac{C_2 - \mu_{C_2}}{\sigma_{C_2}}, \frac{C_3 - \mu_{C_3}}{\sigma_{C_3}}, \frac{C_4 - \mu_{C_4}}{\sigma_{C_4}}, \frac{C_5 - \mu_{C_5}}{\sigma_{C_5}} \right\}$$

can be obtained after standardization. Herein, BCSC represents a result of standardizing BCSC.

In this case, M $\overline{BCSC}$ s obtained after standardization may be clustered. A used clustering method is not limited in this embodiment of this application. For a specific clustering method, refer to the conventional technology. Details are not described herein.

For example, a K-means algorithm may be used to cluster the M $\overline{BCSC}$ s obtained after standardization.

Optionally, K elements in the unevaluated elements may be determined based on the distribution relationship among the unevaluated elements, where K is a positive integer less than M; and the target network structure is selected from the M network structures based on the K elements.

The M elements may be aggregated into (one or) a plurality of clusters by clustering the M elements (that is, the M BCSCs).

Correspondingly, a clustering result of the M elements may include the (one or) plurality of clusters obtained after the M elements are clustered. Compared with an element in another cluster, elements in a same cluster are more similar.

Optionally, the clustering result may further include a center of each cluster, and the center of each cluster may be considered as a most representative element in the cluster.

For example, the clustering result of the unevaluated elements may include K clusters, and K is a positive integer less than M. In this case, the K elements that are in the unevaluated elements and that are determined based on the distribution relationship among the unevaluated elements may be K elements corresponding to cluster centers of the K clusters.

In this embodiment of this application, similar network structures in the structures indicated by the M elements may be clustered into one cluster by clustering the M elements in the search space. A plurality of clusters obtained through clustering help efficiently select the target network structure satisfying a preset requirement from the M network structures.

For example, the clustering result may include K clusters. In this case, one element may be selected from each cluster to obtain the K elements, and K network structures indicated by the K elements are evaluated, to obtain evaluation results of the K network structures.

Evaluating the K network structures indicated by the K elements may refer to testing accuracy (or precision) of the K network structures.

Further, the K elements may be K elements corresponding to centers of the K clusters.

Optionally, selecting the target network structure from the M network structures based on the K elements may include:

evaluating K network structures indicated by the K elements in the unevaluated elements, to obtain evaluation results of evaluated elements, where the evaluation results of the evaluated elements include evaluation results of the K network structures; and selecting the target network structure from the M network structures based on the evaluation results of the evaluated elements.

In this embodiment of this application, the K network structures indicated by the K elements corresponding to the centers of the K clusters are the most representative network structures in the search space. The target network structure that satisfies a preset requirement is selected from the M network structures based on the evaluation results of the K network structures indicated by the K elements corresponding to the centers of the K clusters, so that the target network structure that satisfies the preset requirement can be efficiently selected from the M network structures. Therefore, neural network construction efficiency can be improved.

If accuracy (or precision) of at least one network structure in the K network structures indicated by the K elements satisfies a preset requirement, the network structure is the target network structure, and a neural network may be constructed based on the network structure.

If there is no network structure that satisfies the preset requirement, iterative selection needs to be continued in the M network structures based on an evaluation result of an evaluated network structure, until the target network structure that satisfies the preset requirement is selected.

For example, modeling may be performed on first unevaluated elements based on the evaluation results of the evaluated elements, to obtain models of the first unevaluated elements, where the first unevaluated elements include elements other than the evaluated elements in the search space; and the target network structure is selected from the M network structures based on the models of the first unevaluated elements.

Optionally, modeling may be performed by using the following methods.

Method 1:

Modeling may be performed on the first unevaluated elements based on the evaluation results of the evaluated elements according to the following formula, to obtain models of unevaluated network structures:

$$\frac{g(x)}{l(x)} \text{ and/or } (g(x)-l(x))^2.$$

Herein, x represents an unevaluated network structure in the search space, y* represents a precision threshold, g(x) represents a conditional probability density function of a network structure x whose precision is greater than the precision threshold y*, $$g(x) = \sum_{\{i|y_i > y^*\}} \omega_i G^*(x|x_i),$$

l(x) represents a conditional probability density function of a network structure x whose precision is less than or equal to the precision threshold y*, $$l(x) = \sum_{\{i|y_i \leq y^*\}} \omega_i G^*(x|x_i),$$

$G^*(x|x_i)$ represents a Gaussian distribution, $$G^*(x|x_i) = \frac{1}{Z} e^{-\frac{(\kappa^*(x,x_i))^2}{2\sigma^2}},$$

$\kappa(x,x_i)$ represents a Euclidean distance between x and $x_i$, $\kappa^*(x, x_i)$ represents a distance function including $\kappa(x, x_i)$, $$\kappa^*(x, x_i) = \begin{cases} \kappa(x, x_i), & \text{if } \kappa(x, x_i) < 2\sigma \\ \infty, & \text{if } \kappa(x, x_i) \geq 2\sigma \end{cases},$$

$x_i$ represents an $i^{th}$ network structure in the evaluated network structures, $y_i$ represents precision of the $i^{th}$ network structure in the evaluated network structures, $\omega_i$ represents a weight corresponding to $G^*(x|x_i)$, Z represents a normalization factor, σ represents a hyperparameter of $G^*(x\ x_i)$, i is a positive integer, and e is a base of a natural logarithm function.

In the foregoing model, the weight $\omega_i$ corresponding to $G^*(x\ x_i)$ can satisfy $\omega_i > 0$, $$\sum_{\{i|y_i > y^*\}} \omega_i = 1, \text{ and } \sum_{\{i|y_i \leq y^*\}} \omega_i = 1;$$

when $y_i \leq y^*$, a larger $y_i$ indicates a larger $y_i$ indicates a smaller $\omega_i$; or when $y_i > y_i > y^*$, a larger $y_i$ indicates a larger ωi; Z can satisfy $$Z = \int e^{-\frac{(\kappa^*(x,x_i))^2}{2\sigma^2}} dx;$$

a value σ may be half of a value of an average Euclidean distance of elements corresponding to centers of all clusters after clustering.

Optionally, the foregoing $$\frac{g(x)}{l(x)}$$

is positively correlated with network structure performance. To be specific, a larger value of $$\frac{g(x)}{l(x)}$$

indicates better network structure performance corresponding to $$\frac{g(x)}{l(x)}.$$

The foregoing $(g(x)-l(x))^2$ is positively correlated with uncertainty of network structure performance. To be specific, a larger value of $(g(x)-l(x))^2$ indicates higher uncertainty, of network structure performance, corresponding to $(g(x)-l(x))^2$.

Optionally, when both $$\frac{g(x)}{l(x)}$$

and $(g(x)-l(x))^2$ are used, a ratio of the two models may be set based on experience.

For example, modeling may be performed by using $$\frac{g(x)}{l(x)}$$

and $(g(x)-l(x))^2$ in a ratio of 3:1.

In this case, if four network structures need to be selected, three network structures whose $$\frac{g(x)}{l(x)}$$

values are the largest and one network structure whose $(g(x)-l(x))^2$ value is the largest may be selected.

If accuracy (or precision) of at least one network structure in the four network structures satisfies a preset requirement, the network structure is the target network structure, and a neural network may be constructed based on the network structure.

If there is no network structure that satisfies the preset requirement, the target network structure is reselected from the M network structures based on evaluation results of evaluated network structures (including the four selected network structures).

Method 2:

Modeling may be performed on the first unevaluated elements based on the evaluation results of the evaluated elements according to the following formula, to obtain the models of the first unevaluated elements:

$$\varphi_{EI}(x) = \mathbb{E}(\max(0, f(x) - \tau | \mathcal{O})).$$

Herein, x represents an unevaluated element in the search space, $\mathcal{O} = \{(x_0, y_0), (x_1, y_1), \ldots\}$, $x_i$ represents an $i^{th}$ element in the evaluated elements, $y_i$ represents precision of the $i^{th}$ element in the evaluated elements, $\tau = \max(y_i)$, $\mathbb{E}$ represents an expectation function, $f(x)$ is a random variable subject to a Gaussian distribution, and a mean $\mu(x)$ of $f(x)$, a variance $\sigma(x)$ of $f(x)$, $\mathcal{O}$, and an input x satisfy the following relationship:

$$\mu(x) = k^T (K + \eta^2 I)^{-1} Y; \text{ and}$$

$$\sigma(x) = 1 - k^T (K + \eta^2 I)^{-1} k.$$

Herein, n is a quantity of evaluated network structures, Y is a vector including $y_i$, $Y \in \mathbb{R}^n$, $Y_i = y_i$, k is a vector including $\eta(x_i, x_j)$, K is a matrix including $\kappa(x_i, x_j)$, $K \in \mathbb{R}^{n \times n}$, $K_{i,j} = \kappa(x_i, x_j)$, $$\kappa(x, x') = e^{\left(-\frac{1}{2\sigma^2}\|x - x'\|^2\right)},$$

σ is a hyperparameter, e is a base of a natural logarithm function, I is an identity matrix, η is also a hyperparameter, and i,j are positive integers.

It should be noted that the foregoing modeling methods are merely examples rather than limitations. In this embodiment of this application, modeling may alternatively be performed by using another method.

Further, when the target network structure fails to be selected from the M network structures based on the distribution relationship among the unevaluated elements in the search space, the method may further include:

selecting the target network structure from the M network structures based on a distribution relationship among the first unevaluated elements and the models that are of the first unevaluated elements and that are constructed based on the evaluated elements.

Optionally, the selecting the target network structure from the M network structures based on a distribution relationship among the first unevaluated elements and the models that are of the first unevaluated elements and that are constructed based on the evaluated elements may include:

determining L elements in the first unevaluated elements based on the distribution relationship among the first unevaluated elements, where L is a positive integer less than M; and selecting the target network structure from the M network structures based on the L elements and the models that are of the first unevaluated elements and that are constructed based on the evaluated elements.

Optionally, the selecting the target network structure from the M network structures based on the L elements and the models that are of the first unevaluated elements and that are constructed based on the evaluated elements may include:

determining Q elements in the L elements based on the models that are of the first unevaluated elements and that are constructed based on the evaluated elements, where Q is a positive integer less than L; evaluating Q network structures indicated by the Q elements, to obtain evaluation results of first evaluated elements, where the evaluation results of the first evaluated elements include the evaluation results of the K network structures and evaluation results of the Q network structures; and selecting the target network structure from the M network structures based on the evaluation results of the first evaluated elements and a distribution relationship among second unevaluated elements, where the second unevaluated elements include elements other than the first evaluated elements in the search space.

The distribution relationship among the first unevaluated elements may be a clustering result of the first unevaluated elements, and the L elements may be elements in L clusters included in the clustering result of the first unevaluated elements.

Optionally, the L elements may be L elements corresponding to centers of the L clusters.

Further, when the target network structure fails to be selected from the M network structures based on the distribution relationship among the first unevaluated elements and the models that are of the first unevaluated elements and that are constructed based on the evaluated elements, the method may further include:

reselecting the target network structure from the M network structures based on the distribution relationship among the second unevaluated elements and models that are of the second unevaluated elements and that are constructed based on the first evaluated elements.

It should be noted that a method for reselecting the target network structure from the M network structures based on the distribution relationship among the second unevaluated elements and the models that are of the second unevaluated elements and that are constructed based on the first evaluated elements is similar to a method for selecting the target network structure from the M network structures based on the distribution relationship among the first unevaluated elements and the models that are of the first unevaluated elements and that are constructed based on the evaluated elements, and details are not described herein again.

This process is iteratively performed until the target network structure that satisfies the preset requirement is selected.

Figure 9:
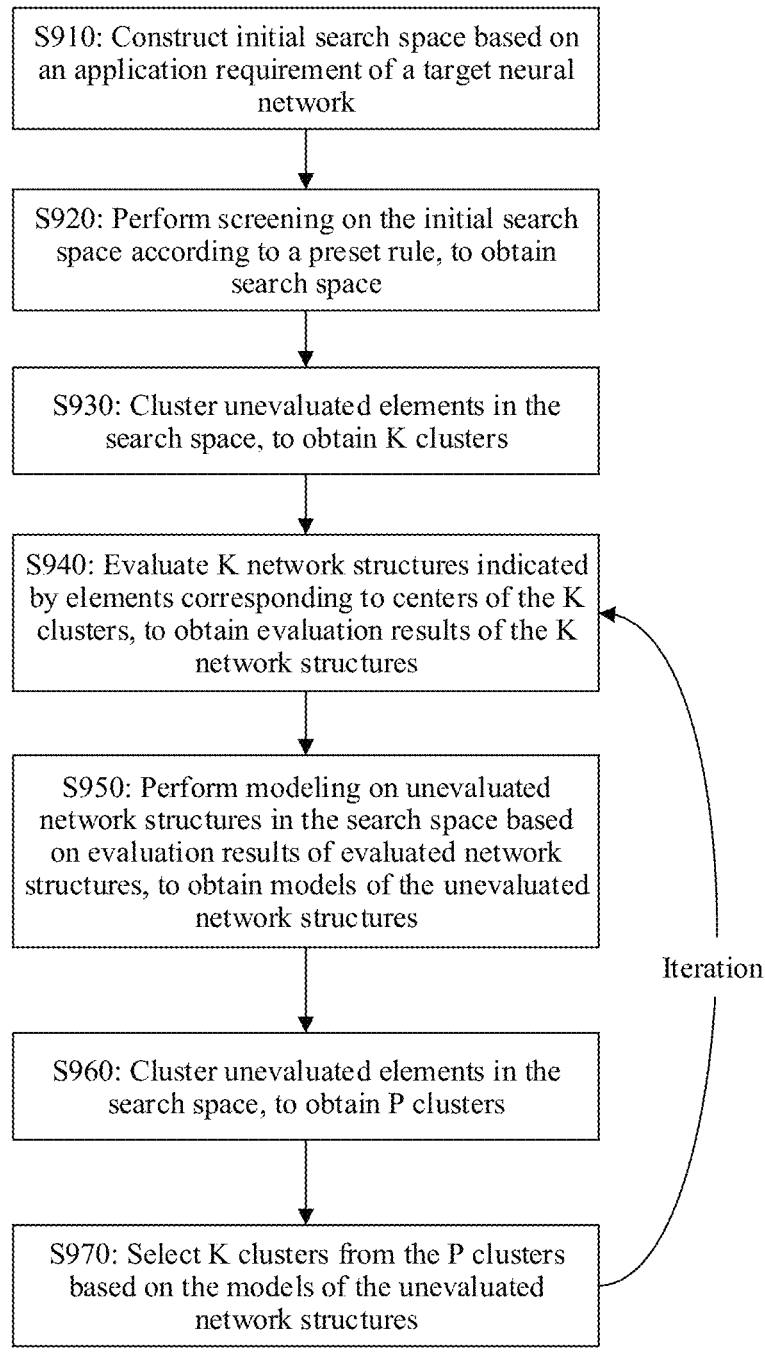
FIG. 9 is a schematic flowchart depicting a neural network construction method according to an embodiment of this application.

FIG. 9 is a schematic flowchart depicting a neural network construction method 900 according to an embodiment of this application. The method may be performed by an apparatus or a device that can construct a neural network. For example, the method may be performed by a terminal device, a computer, a server, or the like.

S910: Construct initial search space based on an application requirement of a target neural network.

The initial search space may include N initial elements, the N initial elements may be used to indicate N network structures, each of the N elements may include a quantity of stages in a corresponding network structure, a quantity of blocks in the stage, and/or a channel quantity of each block, and N is a positive integer.

Optionally, the target neural network may be a convolutional neural network.

In this embodiment of this application, the network structure may include some stages in the convolutional neural network. For example, the network structure may refer to a part that a user expects to adjust (or referred to as a to-be-adjusted part) in the convolutional neural network. Therefore, the network structure may also be referred to as a to-be-adjusted network structure.

The target neural network may be constructed by using at least one network structure. The network structure may include one or more stages, and each stage may include at least one block.

S920: Perform screening on the initial search space according to a preset rule, to obtain search space.

The search space may include M elements, the M elements may be used to indicate M network structures, the element may include a quantity of stages in the network structure, a quantity of blocks in the stage, and/or a channel quantity of each block, and M is a positive integer less than or equal to N.

Optionally, the preset rule may include:
if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

It can be learned from the foregoing preset rule that, if a network structure that is the same as the second initial network structure can be obtained by performing the following operations on the first initial network structure several times, it indicates that precision of the second initial network structure is higher than precision of the first initial network structure. Correspondingly, the first initial element may be deleted from the initial search space. Specific operations include the following.

(1) Duplicate one block in one stage.
(2) Increase a channel quantity (or width) of one block in one stage.

For example, FIG. 10 shows N network structures, where N is a positive integer greater than 1. In a network structure 1, a stage 1 includes one block, and a channel quantity of each block is 64; a stage 2 includes two blocks, and a channel quantity of each block is 128; a stage 3 includes two blocks, and a channel quantity of each block is 256; a stage 4 includes four blocks, and a channel quantity of each block is 512. In a network structure 2, a stage 1 includes one block, and a channel quantity of each block is 64; a stage 2 includes one blocks, and a channel quantity of each block is 128; a stage 3 includes two blocks, and a channel quantity of each block is 256; a stage 4 includes three blocks, and a channel quantity of each block is 512.

It can be learned from FIG. 10 that, if one block in the stage 2 and one block in the stage 4 in the network structure 2 are duplicated, the stage 2 includes two blocks whose channel quantities are 128, and the stage 4 includes four blocks whose channel quantities are 512. In this case, a network structure 2 obtained after the duplication is the same as the network structure 1. This indicates that precision of the network structure 2 is lower than that of the network structure 1, and the network structure 2 (that is, an element corresponding to the network structure 2) may be deleted from the initial search space.

Alternatively, two initial elements in the initial search space may be directly compared.

For example, a BCSC of the first initial element may be directly compared with a BCSC of the second initial element. When each element in the BCSC of the first initial element is less than a corresponding element in the BCSC of the second initial element, it indicates that precision of the first initial network structure is lower than precision of the second initial network structure. Correspondingly, the first initial element may be deleted from the initial search space.

S930: Cluster unevaluated elements in the search space, to obtain K clusters.

Compared with an element in another cluster, elements in a same cluster are more similar. A clustering result may further include a center of each cluster, and the center of each cluster may be considered as a most representative element in the cluster.

In this embodiment of this application, the unevaluated elements in the search space are the M elements in the search space, and before the M elements are clustered, the M elements (that is, M BCSCs) may be first standardized. For a specific standardization process, refer to the conventional technology. This is not limited in this application.

Optionally, means and variances of the M BCSCs in all dimensions may be collected.

For example, the means in all the dimensions may be denoted as $\{\mu_{D_2}, \mu_{D_3}, \mu_{D_4}, \mu_{D_5}, \mu_{D_2}, \mu_{D_3}, \mu_{D_4}, \mu_{D_5}\}$. Herein, $\sigma_{D_2}$ represents a mean of quantities of blocks in the second stage, $\mu_{D_3}$ represents a mean of quantities of blocks in the third stage, $\mu_{D_4}$ represents a mean of quantities of blocks in the fourth stage, $\mu_{D_5}$ represents a mean of quantities of blocks in the fifth stage, $\mu_{C_2}$ represents a mean of channel quantities of blocks in the second stage, $\mu_{C_3}$ represents a mean of channel quantities of blocks in the third stage, $\mu_{C_4}$ represents a mean of channel quantities of blocks in the fourth stage, and $\mu_{C_5}$ represents a mean of channel quantities of blocks in the fifth stage.

Similarly, the variances in all the dimensions may be denoted as $\{\mu_{D_2}, \mu_{D_3}, \mu_{D_4}, \mu_{D_5}, \mu_{D_2}, \mu_{D_3}, \mu_{D_4}, \mu_{D_5}\}$. Herein, $\mu_{D_2}$. Herein, $\sigma_{D_2}$ represents a variance of quantities of blocks in the second stage, $\sigma_{D_3}$ represents a variance of quantities of blocks in the third stage, $\sigma_{D_4}$ represents a variance of quantities of blocks in the fourth stage, $\sigma_{D_5}$ represents a variance of quantities of blocks in the fifth stage, $\sigma_{C_2}$ represents a variance of channel quantities of blocks in the second stage, $\sigma_{C_3}$ represents a variance of channel quantities of blocks in the third stage, $\sigma_{C_4}$ represents a variance of channel quantities of blocks in the fourth stage, and $\sigma_{C_5}$ represents a variance of channel quantities of blocks in the fifth stage.

For each BCSC={$D_2$, $D_3$, $D_4$, $D_5$, $D_2$, $C_2$, $C_3$, $C_4$, $C_5$}.

$$\overline{BCSC} = \left\{ \frac{D_2 - \mu_{D_2}}{\sigma_{D_2}}, \frac{D_3 - \mu_{D_3}}{\sigma_{D_3}}, \frac{D_4 - \mu_{D_4}}{\sigma_{D_4}}, \right.$$

$$\left. \frac{D_5 - \mu_{D_5}}{\sigma_{D_5}}, \frac{C_2 - \mu_{C_2}}{\sigma_{C_2}}, \frac{C_3 - \mu_{C_3}}{\sigma_{C_3}}, \frac{C_4 - \mu_{C_4}}{\sigma_{C_4}}, \frac{C_5 - \mu_{C_5}}{\sigma_{C_5}} \right\}$$

can be obtained after standardization. Herein, $\overline{BCSC}$ represents a result of standardizing BCSC.

In this case, M $\overline{BCSC}$ s obtained after standardization may be clustered. A used clustering method is not limited in this embodiment of this application. For a specific clustering method, refer to the conventional technology. Details are not described herein.

For example, a K-means algorithm may be used to cluster the M $\overline{BCSC}$ s obtained after standardization.

S940: Evaluate K network structures indicated by elements corresponding to centers of the K clusters, to obtain evaluation results of the K network structures.

If accuracy (or precision) of at least one network structure in the K network structures indicated by the elements corresponding to the centers of the K clusters satisfies a preset requirement, the network structure is the target network structure, and a neural network may be constructed based on the network structure.

If there is no network structure that satisfies the preset requirement, S950 continues to be performed.

S950: Perform modeling on unevaluated network structures in the search space based on evaluation results of evaluated network structures, to obtain models of the unevaluated network structures.

Optionally, modeling may be performed on unevaluated network structures in the M network structures based on the evaluation results of the evaluated network structures, to obtain models of the unevaluated network structures. The evaluated network structures may include the K network structures indicated by the elements corresponding to the centers of the K clusters.

It should be understood that a specific modeling method is not limited in this embodiment of this application. For descriptions of the modeling method, refer to the embodiment of the method 700 in FIG. 7. Details are not described herein again.

S960: Cluster unevaluated elements in the search space, to obtain P clusters.

Compared with an element in another cluster, elements in a same cluster are more similar. A clustering result may further include a center of each cluster, and the center of each cluster may be considered as a most representative element in the cluster.

In this embodiment of this application, in the first iteration process, unevaluated elements in the search space are M–K elements in the search space. In the second iteration process, unevaluated elements in the search space are M–2 x K elements in the search space. In each of subsequent iteration processes, unevaluated elements in the search space are M elements minus evaluated elements in the search space.

It should be noted that, in this embodiment of this application, there is no limitation that a same quantity of elements are evaluated in each iteration process, and the K elements are merely an example rather than a limitation. In other words, a different quantity of elements may be evaluated in each iteration process.

S970: Select K clusters from the P clusters based on the models of the unevaluated network structures.

Optionally, accuracy of the unevaluated network structures may be evaluated based on the models of the unevaluated network structures, to obtain evaluated accuracy. Then, K network structures with highest accuracy are selected from the P clusters for evaluation.

It should be noted that if there is no network structure that satisfies the preset requirement, S940, S950, S960, and S970 may be iteratively performed, that is, iterative selection continues to be performed in the search space, until the target network structure that satisfies the preset requirement is selected.

In a subsequent iteration process, unevaluated elements in the search space are always elements other than evaluated elements.

Optionally, in the first iteration process, unevaluated elements in the search space are elements other than K evaluated elements in the search space. In other words, in this case, the unevaluated elements are M–K elements.

A subsequent iteration process is similar to the first iteration process, and details are not described herein.

For example, in the first iteration process, the unevaluated elements in the search space may be clustered into the P clusters according to the method in S960. In this case, K elements may be selected from the P clusters based on models of the unevaluated elements, and the K elements are evaluated according to the method in S940, where P and K are positive integers.

If accuracy (or precision) of at least one network structure in the K network structures satisfies the preset requirement, the network structure is the target network structure, and a neural network may be constructed based on the network structure.

If there is no network structure that satisfies the preset requirement, modeling continues to be performed on unevaluated elements according to the method in S950 based on evaluation results of 2×K evaluated network structures, and the target network structure satisfying the preset requirement is selected in the search space according to the method in S960 and S970 based on models of the unevaluated elements and a distribution relationship among the unevaluated elements.

In this case, if accuracy (or precision) of at least one network structure satisfies the preset requirement, the network structure is the target network structure, and a neural network may be constructed based on the network structure.

If there is still no network structure that satisfies the preset requirement, iterative selection may continue to be performed according to S940, S950, S960, and S970, until the target network structure that satisfies the preset requirement is selected.

Figure 11:
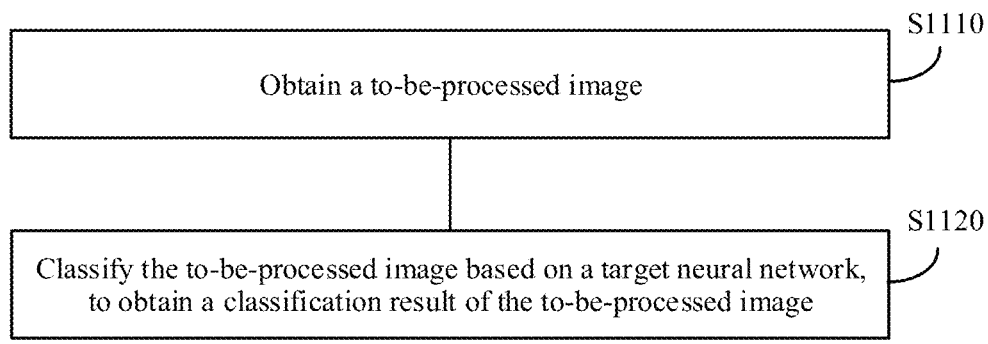
FIG. 11 is a schematic flowchart depicting an image processing method according to an embodiment of this application.

FIG. 11 is a schematic flowchart depicting an image processing method 1100 according to an embodiment of this application. The method may be performed by an apparatus or a device that can perform image processing. For example, the method may be performed by a terminal device, a computer, a server, or the like.

A target neural network used in the image processing method 1100 in FIG. 11 may be constructed by using the method 700 in FIG. 7 or the method 900 in FIG. 9, or may be constructed by using another method. This is not limited in this embodiment of this application.

S1110: Obtain a to-be-processed image.

The to-be-processed image may be an image shot by a terminal device (or another apparatus or device such as a computer or a server) by using a camera, or the to-be-processed image may be an image obtained from a terminal device (or another apparatus or device such as a computer or a server) (for example, an image stored in an album of the terminal device or an image obtained by the terminal device from the cloud). This is not limited in this embodiment of this application.

S1120: Classify the to-be-processed image based on a target neural network, to obtain a classification result of the to-be-processed image.

The target neural network is constructed by using a target network structure, and the target network structure is obtained by using the method 700 in FIG. 7 or the method 900 in FIG. 9.

It should be understood that, before image classification, the target neural network used in the image processing method further needs to be trained based on a training image, and the to-be-processed image may be classified based on a trained target neural network.

In other words, the target neural network may be constructed by using the target network structure obtained in the method 700 in FIG. 7 or the method 900 in FIG. 9, and then the target neural network is trained based on the training image. After the training is completed, the to-be-processed image may be classified based on the target neural network.

In this application, because the target neural network is constructed by using the target network structure obtained in the method 700 in FIG. 7 or the method 900 in FIG. 9, the target neural network relatively satisfies or fits an application requirement of the neural network. A relatively good image classification effect (for example, a more accurate classification result) can be achieved by using such a neural network for image classification.

Figure 12:
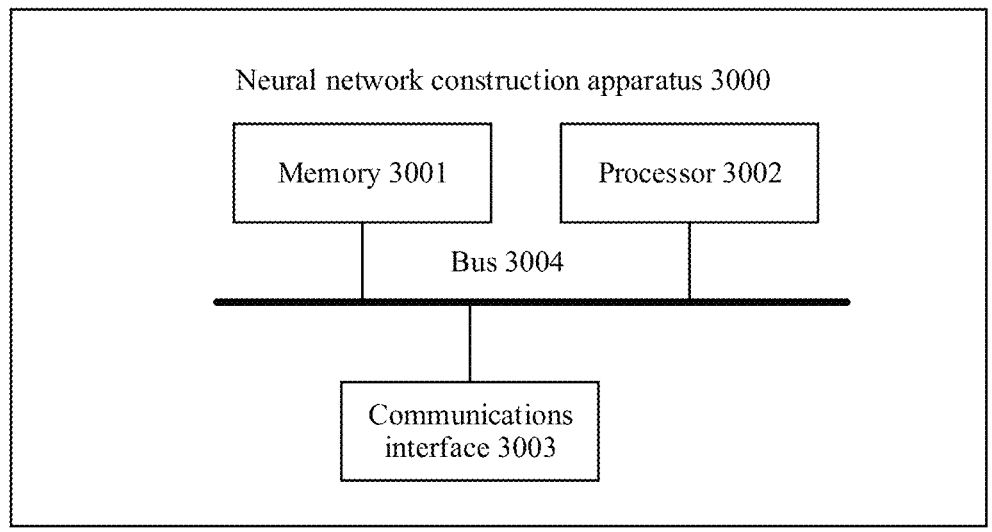
FIG. 12 is a schematic block diagram depicting a neural network construction apparatus according to an embodiment of this application.

FIG. 12 is a schematic diagram depicting a hardware structure of a neural network construction apparatus according to an embodiment of this application. The neural network construction apparatus 3000 (the apparatus 3000 may be specifically a computer device) shown in FIG. 12 includes a memory 3001, a processor 3002, a communications interface 3003, and a bus 3004. The memory 3001, the processor 3002, and the communications interface 3003 are communicatively connected to each other by using the bus 3004.

The memory 3001 may be a read-only memory (ROM), a static storage device, a dynamic storage device, or a random access memory (RAM). The memory 3001 may store a program. When the program stored in the memory 3001 is executed by the processor 3002, the processor 3002 is configured to perform the steps of the neural network construction method in the embodiments of this application.

The processor 3002 may be a general-purpose central processing unit (CPU), a microprocessor, an application-specific integrated circuit (ASIC), a graphics processing unit (GPU), or one or more integrated circuits, and is configured to execute a related program, to implement the neural network construction method in the method embodiments of this application.

Alternatively, the processor 3002 may be an integrated circuit chip such as the chip shown in FIG. 5, and has a signal processing capability. In an implementation process, the steps of the neural network construction method in this application may be completed by using a hardware integrated logic circuit or an instruction in a form of software in the processor 3002.

Alternatively, the processor 3002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 3001. The processor 3002 reads information in the memory 3001, and completes, in combination with hardware of the processor 3002, functions that need to be performed by units included in the neural network construction apparatus, or performs the neural network construction method in the method embodiments of this application.

The communications interface 3003 uses a transceiver apparatus, for example but not for limitation, a transceiver, to implement communication between the apparatus 3000 and another device or a communications network. For example, information about a to-be-constructed neural network and training data required in a neural network construction process may be obtained through the communications interface 3003.

The bus 3004 may include a path for transmitting information between the components (for example, the memory 3001, the processor 3002, and the communications interface 3003) of the apparatus 3000.

Figure 13:
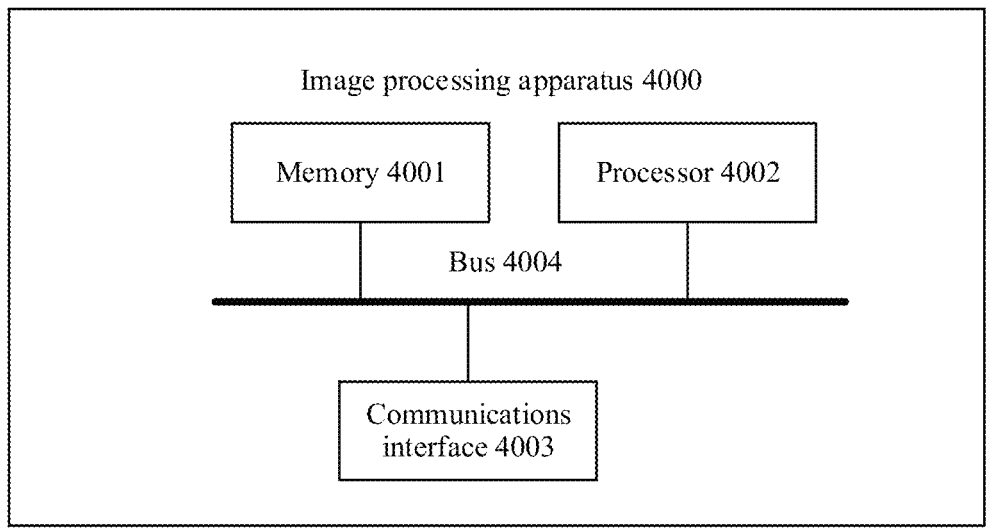
FIG. 13 is a schematic block diagram depicting an image processing apparatus according to an embodiment of this application.

FIG. 13 is a schematic diagram depicting a hardware architecture of an image processing apparatus according to an embodiment of this application. The image processing apparatus 4000 shown in FIG. 13 includes a memory 4001, a processor 4002, a communications interface 4003, and a bus 4004. The memory 4001, the processor 4002, and the communications interface 4003 are communicatively connected to each other by using the bus 4004.

The memory 4001 may be a ROM, a static storage device, or a RAM. The memory 4001 may store a program. When the program stored in the memory 4001 is executed by the processor 4002, the processor 4002 and the communications interface 4003 are configured to perform the steps of the image processing method in the embodiments of this application.

The processor 4002 may be a general-purpose CPU, a microprocessor, an ASIC, a GPU, or one or more integrated circuits, and is configured to execute a related program, to implement functions that need to be performed by units in the image processing apparatus in the embodiments of this application, or perform the image processing method in the method embodiments of this application.

Alternatively, the processor 4002 may be an integrated circuit chip such as the chip shown in FIG. 5, and has a signal processing capability. In an implementation process, the steps of the image processing method in the embodiments of this application may be completed by using a hardware integrated logic circuit or an instruction in a form of software in the processor 4002.

Alternatively, the processor 4002 may be a general-purpose processor, a DSP, an ASIC, an FPGA or another programmable logic device, a discrete gate or a transistor logic device, or a discrete hardware component. The methods, steps, and logical block diagrams that are disclosed in the embodiments of this application may be implemented or performed. The general-purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, functions that need to be performed by units included in the image processing apparatus in the embodiments of this application, or performs the image processing method in the method embodiments of this application.

The communications interface 4003 uses a transceiver apparatus, for example but not for limitation, a transceiver, to implement communication between the apparatus 4000 and another device or a communications network. For example, a to-be-processed image may be obtained through the communications interface 4003.

The bus 4004 may include a path for transmitting information between the components (for example, the memory 4001, the processor 4002, and the communications interface 4003) of the apparatus 4000.

Figure 14:
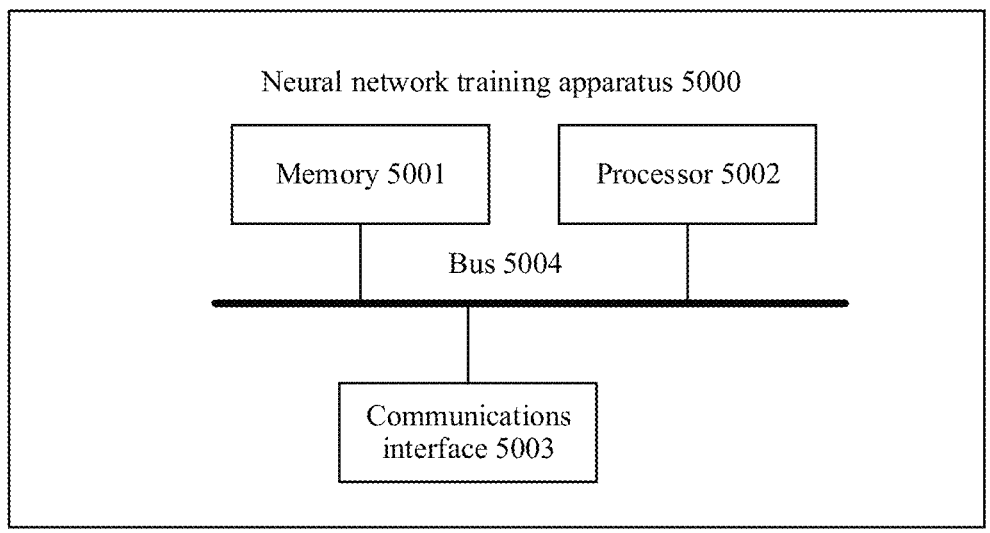
FIG. 14 is a schematic block diagram depicting a neural network training apparatus according to an embodiment of this application.

FIG. 14 is a schematic diagram depicting a hardware structure of a neural network training apparatus according to an embodiment of this application. Similar to the foregoing apparatus 3000 and apparatus 4000, the neural network training apparatus 5000 shown in FIG. 14 includes a memory 5001, a processor 5002, a communications interface 5003, and a bus 5004. The memory 5001, the processor 5002, and the communications interface 5003 are communicatively connected to each other by using the bus 5004.

After a neural network is constructed by using the neural network construction apparatus shown in FIG. 12, the neural network may be trained by using the neural network training apparatus 5000 shown in FIG. 14, and a trained neural network may be used to perform the image processing method in the embodiments of this application.

Specifically, the apparatus shown in FIG. 14 may obtain training data and a to-be-trained neural network from the outside through the communications interface 5003, and then the processor trains the to-be-trained neural network based on the training data.

It should be noted that, although only the memory, the processor, and the communications interface are shown in each of the apparatus 3000, the apparatus 4000, and the apparatus 5000, in a specific implementation process, a person skilled in the art should understand that the apparatus 3000, the apparatus 4000, and the apparatus 5000 each may further include another component necessary for normal running. In addition, based on a specific requirement, a person skilled in the art should understand that the apparatus 3000, the apparatus 4000, and the apparatus 5000 each may further include a hardware component for implementing another additional function. In addition, a person skilled in the art should understand that the apparatus 3000, the apparatus 4000, and the apparatus 5000 each may include only components necessary for implementing the embodiments of this application, but not necessarily include all the components shown in FIG. 12, FIG. 13, or FIG. 14.

It should be understood that, the processor in the embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of random access memories (RAM) can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any other combination. When software is used to implement the embodiments, all or some of the foregoing embodiments may be implemented in a form of a computer program product. The computer program product includes one or more computer instructions or computer programs. When the computer instructions or computer programs are loaded or executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification usually represents an "or" relationship between the associated objects, or may represent an "and/or" relationship. A specific meaning depends on the context.

In this application, "at least one" refers to one or more, and "a plurality of" refers to two or more. "At least one of the following items (pieces)" or a similar expression thereof means any combination of these items, including a single item (piece) or any combination of a plurality of items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A neural network construction method, comprising:
   constructing a search space based on an application requirement of a target neural network, wherein the search space comprises M elements, the M elements are used to indicate M network structures, each of the M elements comprises a quantity of blocks in a stage in a corresponding network structure and a channel quantity of each block, and M is a positive integer;
   selecting a target network structure from the M network structures based on a distribution relationship among unevaluated elements in the search space, wherein selecting the target network structure is performed by
   determining K elements in the unevaluated elements based on the distribution relationship among the unevaluated elements, wherein K is a positive integer less than M,
   evaluating K network structures indicated by the K elements, to obtain evaluation results of evaluated elements, wherein the evaluation results of the evaluated elements comprise evaluation results of the K network structures, and
   selecting the target network structure from the M network structures based on the K elements, and based on the evaluation results of the evaluated elements, by performing modeling on first unevaluated elements based on the evaluation results of the evaluated elements, to obtain models of the first unevaluated elements, wherein the first unevaluated elements comprise elements other than the evaluated elements in the search space;
   selecting the target network structure from the M network structures based on the models of the first unevaluated elements;
   determining that the target structure is the network structure based on an accuracy or a precision of at least one network structure in the K network structures indicated by the K elements satisfying a preset requirement; and
   constructing the neural network based on the target structure.

2. The method according to claim 1, wherein the application requirement comprises a running speed of the target neural network, a parameter quantity of the target neural network, or a structure requirement of the target neural network, wherein the structure requirement comprises a quantity of blocks in each stage in the target neural network and a channel quantity of each block.

3. The method according to claim 1, wherein constructing the search space comprises:
constructing an initial search space based on the application requirement of the target neural network, wherein the initial search space comprises N initial elements, the N initial elements are used to indicate N initial network structures, each of the N initial elements comprises a quantity of blocks in a stage in a corresponding initial network structure and a channel quantity of each block, and N is a positive integer greater than or equal to M; and
performing, according to a preset rule, screening on the N initial network structures indicated by the N initial elements, to obtain the M elements in the search space, wherein the preset rule comprises:
if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

4. The method according to claim 1, wherein the distribution relationship among the unevaluated elements is a clustering result of the unevaluated elements, and the K elements are elements in K clusters comprised in the clustering result of the unevaluated elements.

5. A neural network construction apparatus, comprising:
a processor and a memory, wherein the memory is configured to store program instructions, and the processor is configured to invoke the program instructions to:
construct a search space based on an application requirement of a target neural network, wherein the search space comprises M elements, the M elements are used to indicate M network structures, each of the M elements comprises a quantity of blocks in a stage in a corresponding network structure and a channel quantity of each block, and M is a positive integer;
select a target network structure from the M network structures based on a distribution relationship among unevaluated elements in the search space, wherein selecting the target network structure is performed by
determining K elements in the unevaluated elements based on the distribution relationship among the unevaluated elements, wherein K is a positive integer less than M,
evaluating K network structures indicated by the K elements, to obtain evaluation results of evaluated elements, wherein the evaluation results of the evaluated elements comprise evaluation results of the K network structures, and
selecting the target network structure from the M network structures based on the K elements, and based on the evaluation results of the evaluated elements, by performing modeling on first unevaluated elements based on the evaluation results of the evaluated elements, to obtain models of the first unevaluated elements, wherein the first unevaluated elements comprise elements other than the evaluated elements in the search space;
select the target network structure from the M network structures based on the models of the first unevaluated elements;
determine that the target structure is the network structure based on an accuracy or a precision of at least one network structure in the K network structures indicated by the K elements satisfying a preset requirement; and
construct the neural network based on the target structure.

6. The apparatus according to claim 5, wherein the processor is configured to:
construct an initial search space based on the application requirement of the target neural network, wherein the initial search space comprises N initial elements, the N initial elements are used to indicate N initial network structures, each of the N initial elements comprises a quantity of blocks in a stage in a corresponding initial network structure and a channel quantity of each block, and N is a positive integer greater than or equal to M; and
perform, according to a preset rule, screening on the N initial network structures indicated by the N initial elements, to obtain the M elements in the search space, wherein the preset rule comprises:
if a quantity of blocks in each stage in a first initial network structure indicated by a first initial element in the N initial elements is not greater than a quantity of blocks in a corresponding stage in a second initial network structure indicated by a second initial element in the N initial elements, and a channel quantity of each block in each stage in the first initial network structure is not greater than a channel quantity of each block in a corresponding stage in the second initial network structure, deleting the first initial element from the initial search space.

7. The apparatus according to claim 5, wherein the processor is configured to: determine Q elements in the L elements based on the models that are of the first unevaluated elements and that are constructed based on the evaluated elements, wherein Q is a positive integer less than L; evaluate Q network structures indicated by the Q elements, to obtain evaluation results of first evaluated elements, wherein the evaluation results of the first evaluated elements comprise the evaluation results of the K network structures and evaluation results of the Q network structures; and select the target network structure from the M network structures based on the evaluation results of the first evaluated elements and a distribution relationship among second unevaluated elements, wherein the second unevaluated elements comprise elements other than the first evaluated elements in the search space.

8. The apparatus according to claim 5, wherein the distribution relationship among the first unevaluated elements is a clustering result of the first unevaluated elements, and the L elements are elements in L clusters comprised in the clustering result of the first unevaluated elements.

* * * * *